(12) United States Patent
Suzuki et al.

(10) Patent No.: US 8,389,600 B2
(45) Date of Patent: Mar. 5, 2013

(54) INK JET RECORDING METHOD, AND INK JET RECORDING APPARATUS

(75) Inventors: Katsuhiko Suzuki, Tokyo (JP); Katsuhiro Shirota, Kawasaki (JP); Hirofumi Ichinose, Tokyo (JP); Masashi Tsujimura, Kawasaki (JP); Hiromitsu Kishi, Kawasaki (JP); Takashi Saito, Kawasaki (JP); Sayoko Nagashima, Kawasaki (JP); Fumihiko Mukae, Tokyo (JP); Yoshihisa Yamashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 704 days.

(21) Appl. No.: 12/534,969

(22) Filed: Aug. 4, 2009

(65) Prior Publication Data
US 2010/0033523 A1 Feb. 11, 2010

(30) Foreign Application Priority Data
Aug. 8, 2008 (JP) .................. 2008-205348

(51) Int. Cl.
| | |
|---|---|
| *A61Q 19/00* | (2006.01) |
| *B41J 2/01* | (2006.01) |
| *B41J 2/015* | (2006.01) |
| *B41J 2/17* | (2006.01) |
| *B41J 2/175* | (2006.01) |
| *B60C 1/00* | (2006.01) |
| *C08F 290/06* | (2006.01) |
| *C08J 3/00* | (2006.01) |
| *C08K 5/54* | (2006.01) |
| *C08L 31/00* | (2006.01) |
| *C08L 33/00* | (2006.01) |
| *C08L 33/06* | (2006.01) |
| *C09B 67/00* | (2006.01) |
| *C09D 5/00* | (2006.01) |
| *C09D 11/00* | (2006.01) |
| *G01D 11/00* | (2006.01) |

(52) U.S. Cl. ............. 523/160; 347/1; 347/21; 347/84; 347/85; 347/86; 347/95; 347/100; 523/161; 524/261; 524/267; 524/556; 524/558; 524/560; 524/906

(58) Field of Classification Search .............. 523/160, 523/161; 524/261, 267, 556, 558, 560, 906; 347/1, 21, 84, 85, 86, 95, 100
See application file for complete search history.

(56) References Cited

U.S. PATENT DOCUMENTS
(Continued)

FOREIGN PATENT DOCUMENTS
| | | |
|---|---|---|
| JP | 11-181341 | 7/1999 |
| JP | 11-228898 | 8/1999 |

(Continued)

*Primary Examiner* — Patrick Niland
(74) *Attorney, Agent, or Firm* — Fitzpatrick, Cella, Harper & Scinto

(57) ABSTRACT

Provided are an ink jet ink set, an ink jet recording method, and an ink jet recording apparatus each of which can reduce the graininess of an image to be recorded and improve the water fastness of the image even in a recording medium such as plain paper. The ink jet ink set has a first ink and a second ink independently, and is used so that the first and second inks overlap each other at least partly upon application of the inks to a recording medium. The first ink contains at least a pigment and a silicone oil. The second ink contains at least a pigment and a graft polymer that includes at least a nonionic unit represented by the general formula (I) and a unit having a polysiloxane structure.

15 Claims, 6 Drawing Sheets

U.S. PATENT DOCUMENTS

| | | | |
|---|---|---|---|
| 4,723,129 A | 2/1988 | Endo et al. | 346/1.1 |
| 4,740,796 A | 4/1988 | Endo et al. | 346/1.1 |
| 4,804,411 A | 2/1989 | Eida et al. | 106/22 |
| 4,864,324 A | 9/1989 | Shirota et al. | 346/1.1 |
| 5,059,246 A | 10/1991 | Yamamoto et al. | 106/22 |
| 5,074,914 A | 12/1991 | Shirota et al. | 106/22 |
| 5,110,356 A | 5/1992 | Shirota et al. | 106/22 |
| 5,118,351 A | 6/1992 | Shirota et al. | 106/22 |
| 5,123,960 A | 6/1992 | Shirota et al. | 106/22 |
| 5,135,570 A | 8/1992 | Eida et al. | 106/22 |
| 5,135,571 A | 8/1992 | Shirota et al. | 106/22 |
| 5,139,573 A | 8/1992 | Yamamoto et al. | 106/22 |
| 5,141,558 A | 8/1992 | Shirota et al. | 106/22 |
| 5,151,128 A | 9/1992 | Fukushima et al. | 106/20 |
| 5,190,581 A | 3/1993 | Fukushima et al. | 106/20 D |
| 5,216,437 A | 6/1993 | Yamamoto et al. | 346/1.1 |
| 5,220,347 A | 6/1993 | Fukushima et al. | 346/1.1 |
| 5,221,333 A | 6/1993 | Shirota et al. | 106/20 D |
| 5,231,417 A | 7/1993 | Shirota et al. | 346/1.1 |
| 5,248,991 A | 9/1993 | Shirota et al. | 346/1.1 |
| 5,250,121 A | 10/1993 | Yamamoto et al. | 106/22 R |
| 5,254,157 A | 10/1993 | Koike et al. | 106/20 D |
| 5,258,066 A | 11/1993 | Kobayashi et al. | 106/22 R |
| 5,296,022 A | 3/1994 | Kobayashi et al. | 106/20 D |
| 5,329,305 A | 7/1994 | Fukushima et al. | 347/95 |
| 5,358,558 A | 10/1994 | Yamamoto et al. | 106/22 R |
| 5,427,611 A | 6/1995 | Shirota et al. | 106/22 A |
| 5,500,023 A | 3/1996 | Koike et al. | 8/499 |
| 5,515,093 A | 5/1996 | Haruta et al. | 347/101 |
| 5,540,764 A | 7/1996 | Haruta et al. | 106/20 R |
| 5,593,757 A | 1/1997 | Kashiwazaki et al. | 428/195 |
| 5,606,356 A | 2/1997 | Noguchi et al. | 347/100 |
| 5,614,007 A | 3/1997 | Kurabayashi et al. | 106/22 R |
| 5,621,447 A | 4/1997 | Takizawa et al. | 347/88 |
| 5,640,187 A | 6/1997 | Kashiwazaki et al. | 347/101 |
| 5,658,376 A | 8/1997 | Noguchi et al. | 106/31.43 |
| 5,680,165 A | 10/1997 | Takizawa et al. | 347/88 |
| 5,696,182 A | 12/1997 | Kashiwazaki et al. | 523/161 |
| 5,698,478 A | 12/1997 | Yamamoto et al. | 442/153 |
| 5,700,314 A | 12/1997 | Kurbayashi et al. | 106/31.27 |
| 5,734,403 A | 3/1998 | Suga et al. | 347/101 |
| 5,764,261 A | 6/1998 | Koike et al. | 347/100 |
| 5,781,216 A | 7/1998 | Haruta et al. | 347/106 |
| 5,782,967 A | 7/1998 | Shirota et al. | 106/31.58 |
| 5,792,249 A | 8/1998 | Shirota et al. | 106/31.27 |
| 5,902,387 A | 5/1999 | Suzuki et al. | 106/22 R |
| 5,922,625 A | 7/1999 | Haruta et al. | 442/75 |
| 6,036,307 A | 3/2000 | Hakamada et al. | 347/106 |
| 6,084,006 A | 7/2000 | Kashiwazaki et al. | 523/160 |
| 6,139,939 A | 10/2000 | Haruta et al. | 428/195 |
| 6,153,001 A | 11/2000 | Suzuki et al. | 106/31.65 |
| 6,162,510 A | 12/2000 | Kashiwazaki et al. | 427/511 |
| 6,203,604 B1 | 3/2001 | Kashiwazaki et al. | 106/31.5 |
| 6,214,963 B1 | 4/2001 | Noguchi et al. | 528/71 |
| 6,248,482 B1 | 6/2001 | Kashiwazaki et al. | 430/7 |
| 6,375,728 B2 | 4/2002 | Yamashita et al. | 106/31.6 |
| 6,391,947 B1 | 5/2002 | Noguchi et al. | 524/84 |
| 6,394,597 B1 | 5/2002 | Koike et al. | 347/106 |
| 6,398,355 B1 | 6/2002 | Shirota et al. | 347/100 |
| 6,402,316 B1 | 6/2002 | Ichinose | 347/101 |
| 6,412,936 B1 | 7/2002 | Mafune et al. | 347/100 |
| 6,426,766 B1 | 7/2002 | Shirota et al. | 347/106 |
| 6,460,987 B1 | 10/2002 | Katsuragi et al. | 347/100 |
| 6,474,803 B1 | 11/2002 | Shirota et al. | 347/100 |
| 6,540,344 B2 | 4/2003 | Kashiwazaki et al. | 347/100 |
| 6,552,156 B2 | 4/2003 | Noguchi et al. | 528/71 |
| 6,605,336 B2 | 8/2003 | Ichinose et al. | 428/195 |
| 6,619,791 B2 | 9/2003 | Tochihara et al. | 347/100 |
| 6,659,601 B2 | 12/2003 | Goto et al. | 347/100 |
| 6,685,999 B2 | 2/2004 | Ichinose et al. | 428/32.25 |
| 6,686,000 B2 | 2/2004 | Ichinose | 428/32.32 |
| 6,723,137 B1 | 4/2004 | Hakamada et al. | 8/549 |
| 6,729,718 B2 | 5/2004 | Goto et al. | 347/100 |
| 6,794,427 B2 | 9/2004 | Kurabayashi et al. | 523/161 |
| 6,802,925 B2 | 10/2004 | Kobayashi et al. | 156/234 |
| 6,860,593 B2 | 3/2005 | Kashiwazaki et al. | 347/100 |
| 6,874,881 B2 | 4/2005 | Shirota et al. | 347/100 |
| 6,921,433 B2 | 7/2005 | Kuribayashi et al. | 106/499 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 6,964,700 B2 | 11/2005 | Uji et al. | 106/31.28 |
| 6,966,944 B2 | 11/2005 | Shimomura et al. | 106/31.43 |
| 7,029,109 B2 | 4/2006 | Shirota et al. | 347/100 |
| 7,055,943 B2 | 6/2006 | Suzuki et al. | 347/100 |
| 7,060,335 B2 | 6/2006 | Ichinose | 428/32.32 |
| 7,208,032 B2 | 4/2007 | Hakamada et al. | 106/31.27 |
| 7,276,110 B2 | 10/2007 | Tsujimura et al. | 106/31.27 |
| 7,285,310 B2 | 10/2007 | Kanke et al. | 427/466 |
| 7,297,194 B2 | 11/2007 | Shinjo et al. | 106/31.27 |
| 7,297,202 B2 | 11/2007 | Ichinose et al. | 106/31.6 |
| 7,297,203 B2 | 11/2007 | Takada et al. | 106/31.8 |
| 7,345,098 B2 * | 3/2008 | Mizushima et al. | 523/160 |
| 7,354,145 B2 | 4/2008 | Nito et al. | 347/96 |
| 7,377,631 B2 | 5/2008 | Takada et al. | 347/100 |
| 7,381,257 B2 | 6/2008 | Takayama et al. | 106/31.78 |
| 7,503,649 B2 | 3/2009 | Kishi et al. | 347/100 |
| 7,517,073 B2 | 4/2009 | Nito et al. | 347/100 |
| 7,517,074 B2 | 4/2009 | Hakamada et al. | 347/100 |
| 2006/0075925 A1 | 4/2006 | Stoffel et al. | 106/31.27 |
| 2007/0191508 A1 | 8/2007 | Nakagawa et al. | 523/160 |
| 2008/0152827 A1 | 6/2008 | Hakamada et al. | 427/466 |
| 2008/0187726 A1 | 8/2008 | Sakai et al. | 428/195.1 |
| 2008/0193647 A1 | 8/2008 | Saito et al. | 427/256 |
| 2008/0193659 A1 | 8/2008 | Takada et al. | 427/407.1 |
| 2008/0206487 A1 * | 8/2008 | Ohkubo et al. | 427/595 |
| 2008/0292793 A1 | 11/2008 | Yamashita et al. | 427/256 |
| 2008/0292794 A1 | 11/2008 | Sato et al. | 427/256 |
| 2009/0136680 A1 | 5/2009 | Kishi et al. | 427/511 |
| 2009/0258145 A1 | 10/2009 | Mukae et al. | 427/256 |
| 2010/0033522 A1 * | 2/2010 | Saito et al. | 347/9 |

FOREIGN PATENT DOCUMENTS

| | | |
|---|---|---|
| JP | 2000-351931 | 12/2000 |
| JP | 2001-288388 | 10/2001 |
| JP | 2002-265831 | 9/2002 |
| JP | 2004-292585 | 10/2004 |
| JP | 2006-117931 | 5/2006 |

* cited by examiner

INK JET RECORDING METHOD, AND INK JET RECORDING APPARATUS

BACKGROUND OF THE INVENTION

1. Field of the Invention

The present invention relates to an ink jet recording method, and an ink jet recording apparatus.

2. Description of the Related Art

In recent years, for ink jet inks, a pigment ink containing a pigment as a coloring material has been widely applied not only to a small printer for use in office and home applications but also to a wide format printer for use in applications where posters, advertisements, and CAD drawings are printed.

In recent years, various contrivances have been made on an apparatus and ink for use in an ink jet recording method, the improvement of the fastness property and image quality of a recorded article to be obtained has progressed, and the recording of an excellent image comparable to a silver salt photograph has been requested. In relation to the foregoing, in order that a high-definition image comparable to a silver salt photograph is obtained in the ink jet recording method, in particular, image graininess needs to be reduced. Since the ink jet recording method is such a system that an image is recorded with ink droplets ejected from nozzles, it can be said that the problem, i.e., graininess may inevitably arise in the image. In particular, upon printing with a wide format printer, a considerably large recording medium such as A0- or A1-size paper is often used. In such cases, the graininess of an image is apt to be remarkable, so the development of a method of effectively reducing the graininess of the image has been demanded.

A method of specifying a relationship between ink and a recording medium and a method of controlling changes in physical properties of ink have been heretofore proposed as methods of reducing the above image graininess. To be specific, a proposal concerning the use of a set of an ink and a recording medium having the following characteristic has been made (see Japanese Patent Application Laid-Open No. 2001-288388): a difference between the SP value of a water-soluble organic solvent or surfactant in the ink and the SP value of at least one kind of a material of which the surface coating layer of the recording medium is formed is set to 2 or less. In addition, a proposal concerning the use of an ink having the following characteristics has been made (see Japanese Patent Application Laid-Open No. 2004-292585): the ink is such that the change in viscosity and the change in surface tension are respectively 100% or less and 5% or less between the time when the ink is dried so that its weight is 80% of its initial weight and the time of the initial weight. Further, a proposal concerning the use of an ink set having the following characteristics has been made (see Japanese Patent Application Laid-Open No. 2006-117931): the ink set is formed of two or more kinds of inks having at least a dark ink and a pale ink independently, and the pigment of the dark ink and the pigment of the pale ink are different from each other in at least one of the crystalline form, particle diameter, chromophore, and dispersant.

In addition, an ink jet recording technique involves the problem that a phenomenon in which an image recorded with a pigment ink on a recording medium is blurred or stained occurs when water or the like contacts the image, that is, the water fastness of the image is insufficient. The following proposal has been made with a view to solving the problem, i.e., the insufficient water fastness of the image (see, for example, Japanese Patent Application Laid-Open No. H11-181341 and Japanese Patent Application Laid-Open No. H11-228898): the time period for which the image is dried after its recording is shortened by using an ink to which various surfactants or solvents are added. In addition, the following proposal has been made (see, for example, Japanese Patent Application Laid-Open No. 2000-351931 and Japanese Patent Application Laid-Open No. 2002-265831): an image is protected by forming a film on the surface of a recorded article with an ink containing various resin emulsions or polymer resins.

SUMMARY OF THE INVENTION

In addition, in recent years, various investigations have been conducted on the ink jet recording method, and attempts have been made to improve the fastness property and quality of a recorded image. However, investigations conducted by the inventors of the present invention have found that a sufficient reduction in graininess of the image cannot be achieved by employing any one of the conventional techniques that are said to achieve a reduction in image graininess typified by the above technique. Here, the occurrence of such graininess is largely affected by the permeation behavior of ink into a recording medium, so an image with remarkable graininess may not be obtained as long as all the applied ink droplets each permeate into the recording medium in a good state. The inventors consider that the permeation behavior of the ink into the recording medium when such graininess occurs is as described below. First, an ink droplet applied to the recording medium is absorbed by (permeates into) the recording medium. After that, as the number of ink droplets applied to the recording medium increases, the rate at which the ink is absorbed gradually reduces, and finally, the ink starts to flood on the surface of the recording medium without being absorbed by the recording medium. The inventors consider that the ink droplets flooding without being absorbed by the recording medium as described above are responsible for the graininess of the image. The inventors consider that, in contrast to the foregoing, when a state where the capacity of the recording medium does not suffice to absorb ink droplets never arises, the ink does not flood, and each ink droplet permeates into the site of the recording medium where it is applied in a good state, whereby an image with reduced graininess is obtained.

Further, a wide format printer has, owing to its characteristics, a longer time interval between the application of ink to a recording medium by the preceding main scanning with a recording head and the application of the ink to the same site by the next main scanning with the recording head than that of a small printer or the like. Accordingly, when an image is recorded with the wide format printer, the image is affected by such permeation behavior as described above to an additionally large extent, so graininess in the image occurs particularly remarkably. In other words, as the width of the printer, i.e., the width of a main scanning with the recording head increases, the time interval between the application of an ink droplet to the recording medium and the application of another ink droplet to the recording medium increases, so the graininess of the image tends to be more remarkable.

In addition, in order that the characteristics, in particular, scratch resistance of an image recorded with ink may be additionally improved, a polymer or the like is added to the ink with a view to providing the ink with, for example, a function of improving the film strength in some cases. Such ink may show a permeation behavior into a recording medium different from that of a general ink free of the polymer, but the graininess of an image recorded with the ink tends to be more remarkable than that of an image recorded with the general ink.

The inventors of the present invention have conducted investigations on the reduction of the occurrence of graininess in an image mainly caused by the time interval between the application of an ink droplet to a recording medium and the application of another ink droplet to the recording medium. As a result, the inventors have found that, when the surface of an image recorded with an ink containing a silicone oil is modified with a specific compound having a silicone component, the graininess of the image is drastically reduced. Further, the inventors have found that, in this case, not only the reduction of the graininess of the image but also an improvement in water fastness of the image is achieved since the specific compound having a silicone component is oriented on the surface of the image so that the image has water repellency. However, the inventors have simultaneously found that, when an image is recorded with such ink on a recording medium having no ink-receiving layer such as the so-called plain paper, the image cannot obtain sufficient water fastness.

Therefore, an object of the present invention is to provide an ink jet recording method using an ink set having the characteristics that even when the ink set is used in recording on a recording medium such as plain paper, an excellent image is obtained, and the ink set is applicable even to a wide format printer. To be specific, the object of the present invention is to provide an ink jet recording method using an ink set that enables the recording of both an image with reduced graininess and an image with improved water fastness. Another object of the present invention is to provide an ink jet recording apparatus which enables the recording of an image that achieves both a reduction in graininess and an improvement in water fastness.

The above objects can be achieved by the present invention as described below. That is, the present invention is an ink jet recording method using an ink set having a first ink and a second ink independently, the ink set of the ink jet recording method being used so that the first ink and the second ink overlap each other at least partly upon application of the inks to a recording medium, wherein the first ink contains at least a pigment and a silicone oil; and the second ink contains at least a pigment and a graft polymer, in which the graft polymer includes at least a nonionic unit represented by the following general formula (I) and a unit having a polysiloxane structure:

General Formula (I)

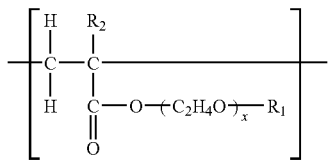

(In the general formula (I), $R_1$ and $R_2$ each independently represent a hydrogen atom or a methyl group, and x represents 1 or 2.)

According to the present invention, there is provided an ink jet recording method using an ink set capable of performing recording of both an image with reduced graininess and an image with improved water fastness. Further, according to the present invention, there is provided an ink jet recording apparatus which is capable of performing recording of an image that achieves both a reduction in graininess and an improvement in water fastness.

Further features of the present invention will become apparent from the following description of exemplary embodiments with reference to the attached drawings.

DESCRIPTION OF THE EMBODIMENTS

Figure 1:
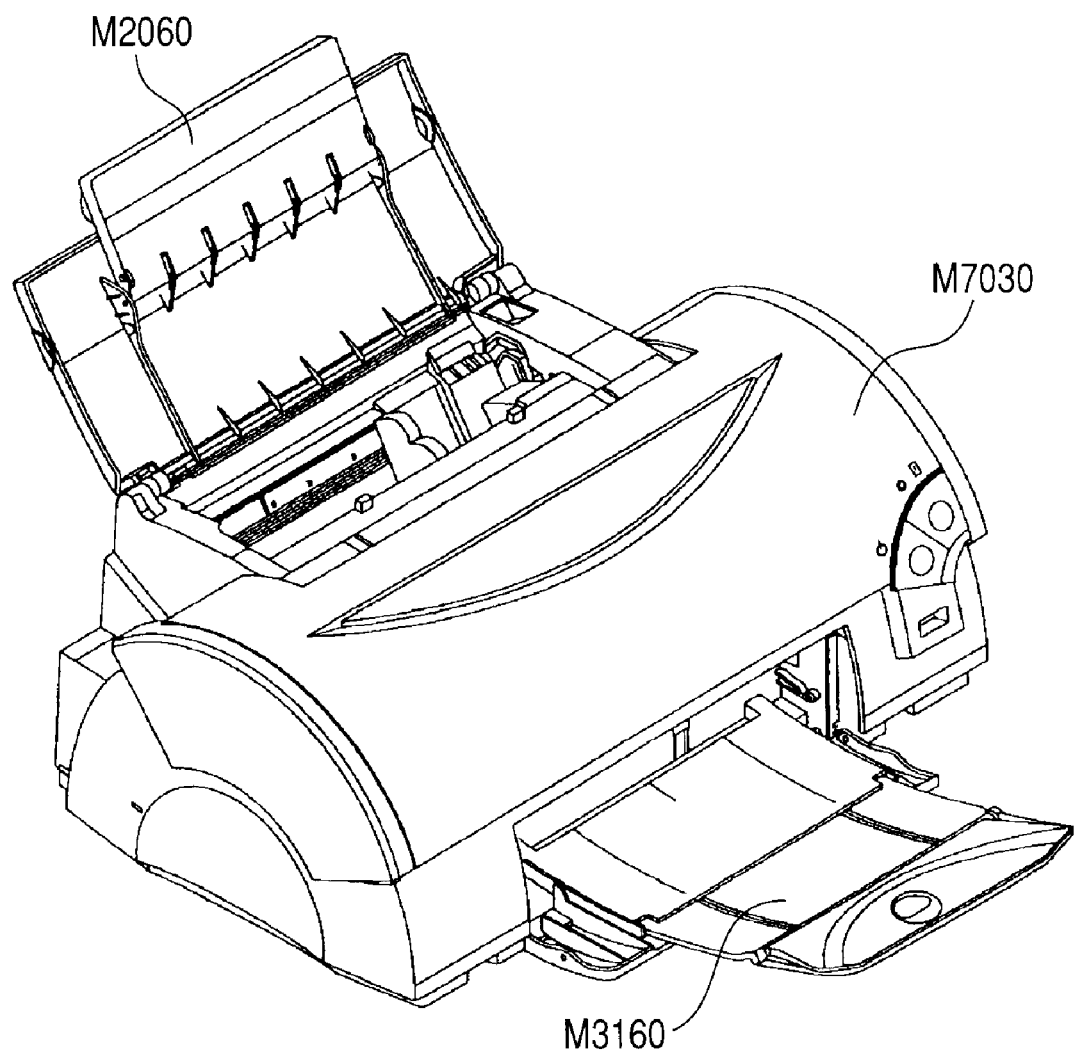
FIG. 1 is a perspective view of an ink jet recording apparatus.

Hereinafter, the present invention is described in detail by way of a preferred embodiment.

The present invention is characterized in that an ink jet ink set obtained by independently combining a specific first ink and a specific second ink is used; and the first ink and the second ink are applied to a recording medium so that these inks overlap each other at least partly. Hereinafter, the first and second inks of the ink jet ink set featuring the present invention are described. The first ink contains a pigment and a silicone oil, and the second ink contains a pigment and a graft polymer having a nonionic unit represented by the following general formula (I) and a unit having a polysiloxane structure.

General Formula (I)

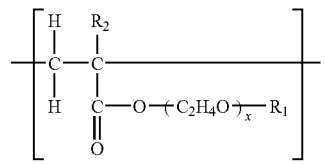

(In the general formula (I), $R_1$ and $R_2$ each independently represent a hydrogen atom or a methyl group, and x represents 1 or 2.)

Here, how the inventors of the present invention have found an ink set of the above constitution is described. First, the inventors have conducted investigations on the reason for the fact that when an ink containing a silicone oil is used, the graininess of an image formed with the ink is drastically reduced, but an image, if recorded on, for example, plain paper having no ink-receiving layer, cannot obtain sufficient water fastness. First, the inventors have conducted investigations on whether or not the permeation behavior of ink into a recording medium varies depending on the presence or absence of a silicone oil in the ink. As a result, the inventors have found that the permeation behavior of the ink into the recording medium varies to a large extent depending on the presence or absence of the silicone oil. To be specific, the inventors have found that, in the case of an ink containing a silicone oil, when a droplet of the ink is further applied to a region of a recording medium where the ink has been applied, the contact angle of the ink droplet applied later relative to the recording medium increases. The inventors have found that, in contrast to the foregoing, in the case of an ink containing no silicone oil, when the ink is applied in the same manner as that described above, the contact angle of the ink droplet applied later relative to the recording medium decreases.

In view of the results of such investigations, the inventors of the present invention consider the mechanism via which the graininess of an image recorded with an ink containing a silicone oil is reduced as described below. When the ink containing the silicone oil is used, an interfacial surface tension in a region of a recording medium where the ink has been already applied is reduced by the silicone oil in the ink, and a contact angle between a droplet of the ink to be applied later to the region and the recording medium increases. Accordingly, the ink droplet to be applied later permeates into the recording medium while showing nearly no spread, whereby the graininess of an image recorded with the ink reduces. In contrast, when an ink containing no silicone oil is used, an interfacial surface tension in a region of the recording medium where the ink has been already applied is high, so a droplet of the ink to be applied later to the region permeates into the recording medium after having largely spread. In addition, in this case, such spread of an ink droplet occurs at random, so unevenness occurs, and hence the graininess of an image recorded with the ink probably becomes remarkable.

In addition, the inventors of the present invention consider the mechanism via which the water fastness of an image recorded with the above ink containing a silicone oil effective in reducing graininess on a recording medium such as plain paper is not improved as described below. The inventors have made extensive studies by measuring the contact angle of a droplet of the ink when the ink droplet is further applied to a region of the recording medium where the ink has been already applied. As a result, the inventors have found that there is a correlation between the contact angle of the above ink droplet and the water fastness of the image. That is, when the contact angle is large, the image is excellent in water fastness; in contrast, when the contact angle is small, the water fastness of the image tends to be low. In view of the foregoing, the above contact angle may vary depending on the amount of the silicone oil oriented on the surface of the image where the ink droplet is applied. In other words, when the amount of the silicone oil oriented on the surface of the image is large, the contact angle increases, whereby the water fastness of the image is improved. However, in the case of the image recorded with the ink containing the silicone oil on plain paper, the silicone oil cannot be efficiently oriented on the surface of the image, so a majority of the silicone oil permeates into the recording medium; this may be the reason why the water fastness of the image recorded with the ink containing the silicone oil on plain paper is not improved.

Further, the inventors of the present invention have recorded an image by applying, to various recording media, multiple inks each containing a silicone oil each of which corresponds to the first ink specified in the present invention so that these inks overlap each other. As a result, the inventors have found that the water fastness of the image in a specific recording medium is not improved. When an image is similarly recorded by applying, to the specific recording medium, multiple inks each containing a graft polymer each of which corresponds to the second ink specified in the present invention so that the inks overlap each other, the water fastness of the image is not improved. The inventors have found that, in contrast to the foregoing, in the case of a secondary color image recorded by causing the first and second inks specified in the present invention to overlap each other, the water fastness of the image is improved even when plain paper is used as a recording medium. In view of the foregoing, the inventors have found that the problem that has heretofore bothered the inventors, i.e., a reduction in water fastness of an image in plain paper is solved by the procedure in which a secondary color image is recorded by causing the first and second inks specified in the present invention to overlap each other. In other words, the inventors have found that, when an image is recorded by using the first and second inks specified in the present invention so that these inks may overlap each other, the graininess of the image can be reduced, and at the same time, an improvement in water fastness of the image can be realized even in a recording medium having high permeability such as plain paper. Thus, the inventors have achieved the present invention.

The inventors of the present invention consider the mechanism via which the water fastness of the above secondary color image recorded by causing the first and second inks specified in the present invention to overlap each other is improved as described below. It should be noted that, in the following description, the first ink and the second ink mean the respective inks specified in the present invention, and the graft polymer means a silicone graft polymer having a specific structure specified in the present invention. First, upon application of the second ink to a recording medium, the molecules of the graft polymer in the ink aggregate in the recording medium to prevent the permeation of water or a water-soluble organic solvent into the recording medium. In other words, the above graft polymer is brought into such a state as to fill the surface of the recording medium. Next, when the first ink is applied, the silicone oil in the ink rests on an image in a state where the surface of the recording medium is filled with the graft polymer. As a result, the silicone oil is efficiently oriented on the surface of an image. Here, the orientation of the silicone oil on the surface of the image has priority over the orientation of the graft polymer on the surface, probably because of a difference in flowability between the graft polymer and the silicone oil. It should be noted that such filling action on a recording medium by a polymer as described above is not exerted only by the graft polymer used in the present invention. However, an effect of the present invention is not obtained until a specific graft polymer having a unit having a polysiloxane structure is used in the second ink. That is, probably, with the constitution of the ink set of the present invention, the polysiloxane compounds in the first and second inks interact with each other, and the interaction enables efficient orientation of the silicone oil on the surface of the image.

It should be noted that, as is apparent from the above mechanism, depending on the order in which the first and second inks are applied to the recording medium, the first ink is applied in a state where the second ink is not applied, so the above filling action may not occur. In ordinary cases, however, the so-called multi-path recording is performed in an ink jet recording method in order that excellent image quality and the like are obtained. Accordingly, when the first and second inks in the present invention are used in ink jet recording, in at least a part of a region where recording is performed by causing the respective inks to overlap each other, the second ink is applied before the first ink is applied. As a result, the effect of the present invention can be obtained. It should be noted that the term "multi-pass recording" refers to a method of recording an image in a unit region by causing a recording head to scan multiple times in the main scanning direction of the recording head, the term "unit region" refers to, for example, one pixel or one band, and the unit region can be set as various regions as required; in addition, the term "one pixel" refers to one pixel corresponding to a resolution, and the term "one band" refers to an image region recorded by one scanning with the recording head.

As described above, the use of the ink set of the present invention can achieve both a reducing effect on the graininess of an image and an improving effect on the water fastness of the image irrespective of a recording medium, for example, even in plain paper. The silicone oil is incorporated into the first ink of the ink set of the present invention so that the silicone oil is oriented on the surface of the image to reduce the graininess of the image, and an improvement in water fastness of the image may be achieved. In addition, the graft polymer is incorporated into the second ink so that the graft polymer is caused to exist on the surface of the recording medium to reduce the graininess of the image. Further, the second ink and the first ink are applied to the recording medium so as to overlap each other for the following purpose: the silicone oil in the first ink is efficiently oriented on the surface of the image by the filling action of the polymer.

It should be noted that, according to the investigations conducted by the inventors of the present invention, both a reduction in graininess of an image and an improvement in water fastness of the image in plain paper cannot be achieved even when an ink containing both the silicone oil and the graft polymer used in the present invention is used. The inventors consider the reason for the foregoing as described below. First, the above filling action on the surface of a recording medium by the graft polymer occurs via the aggregation of the molecules of the polymer due to, for example, an influence of an acidic group in a component of which the recording medium is formed. In contrast, in the case of the ink containing both the above components, the silicone oil adsorbs to the graft polymer in the ink. As a result, the molecules of the graft polymer at least a part of which are dissolved in an aqueous medium are turned into such a state as micelles, so the molecules are hard to aggregate on the surface of the recording medium to which the ink has been applied. By such reason, the molecules of the graft polymer, which should originally show the filling action on the surface of the recording medium through aggregation after the ink has been applied to the recording medium, do not aggregate, but permeate into the recording medium. As a result, the silicone oil can no longer be efficiently oriented on the surface of the image by the graft polymer. In addition, according to the investigations conducted by the inventors, in the case where the ink containing both the above components is used, the abundance of not only the silicone oil but also the graft polymer in the image is smaller than that in the case where inks separately containing these components are used; this may also be the reason why the effect of the present invention cannot be sufficiently obtained. Further, the inventors have found that the ink containing both the silicone oil and the graft polymer is not preferable, since the silicone oil adsorbs to the graft polymer in the ink, and, depending on the composition of the ink, the long-term storage stability of the ink reduces.

In addition, as described above, neither a combination of only multiple inks each corresponding to the first ink nor a combination of only multiple inks each corresponding to the second ink can provide an effect similar to the effect of the present invention even when these inks are applied so as to overlap each other. First, in the case where an image is recorded with a combination of only multiple inks each corresponding to the first ink so that the inks may overlap each other, when plain paper is used as a recording medium, nearly no molecules of the silicone oil remain on the surface of the image. Accordingly, a slight reducing effect on the graininess of the image is observed, but the image cannot obtain sufficient water fastness. A possible reason for the foregoing is that as long as even a trace amount of the silicone oil is present on the surface of the image, the interfacial surface tension of the surface of the image can be reduced, albeit slightly, so the slight reducing effect on the graininess of the image is observed. In addition, in the case where an image is recorded with a combination of only multiple inks each corresponding to the second ink so that the inks may overlap each other, the molecules of the graft polymer aggregate upon application of the inks to a recording medium. Accordingly, the graft polymer having a unit having a polysiloxane structure, the polymer being expected to have the same action as that of the silicone oil, is present on the surface of the image in a larger amount than that in the case where an image is recorded with a combination of only multiple inks each corresponding to the first ink. However, the proportion of the unit having a polysiloxane structure in the graft polymer is limited, causing such a problem that the graft polymer has low flowability because it is a high-molecular-weight compound. Accordingly, it is difficult to cause the silicone graft polymer to exist on the surface of the image until an effect comparable to the effect of the present invention obtained by using the first ink containing the silicone oil is obtained. In addition, an effect obtained by increasing the content of the graft polymer in the inks for alleviating those problems is limitative. In addition, what is worse, the absorption rate of the ink reduces owing to an increase in amount of the polymer remaining on the recording medium, so the graininess of an image to be obtained becomes conversely remarkable.

The inventors of the present invention have found that the graininess of an image is reduced by using inks each containing a polysiloxane compound (the silicone oil or the silicone graft polymer) for achieving both a reduction in graininess of the image and an improvement in water fastness of the image. However, when an image was recorded with those inks on plain paper, the image could not obtain sufficient water fastness. In consideration of the foregoing, the inventors have made extensive studies, and as a result, have found the ink set of the present invention having the above constitution. Investigations were conducted on the water fastness of an image recorded with the ink set of the present invention on a recording medium having an ink-receiving layer such as mat paper or glossy paper for ink jet recording. As a result, the image had sufficient performance. The foregoing shows that the effect obtained by the ink set of the present invention is not an effect obtained only in a specific recording medium such as plain paper, but the effect of the present invention can be obtained irrespective of the kind of a recording medium.

<Ink Set>

Hereinafter, the respective components for forming the first and second inks of the ink set of the present invention are described.

<Silicone Oil>

As described above, the silicone oil incorporated into the first ink is preferably a silicone oil that effectively exerts such an action that after the first ink has been applied to a recording medium, the silicone oil is oriented on the surface of an image formed with the ink so that the interfacial surface tension of the surface of the image is reduced. In the present invention, any silicone oil can be used in the first ink as long as the silicone oil has such action as described above.

Here, the silicone oils are compounds each having a polysiloxane skeleton, and are roughly classified into straight silicone oils and modified silicone oils. The straight silicone oils have a substituent such as a methyl group, a phenyl group, or hydrogen atom. The modified silicone oils are further classified into reactive silicone oils and non-reactive silicone oils. The reactive silicone oils have an active group such as an amino group, an epoxy group, a carboxyl group, a mercapto group, carbinol, or phenol, and the non-reactive silicone oils have an inactive group such as an alkyl group, polyether, or fluorine atom. In the present invention, any one of those silicone oils can be used in the first ink.

Each of a silicone oil newly synthesized for the present invention and a commercially available silicone oil can be used as such silicone oil as described above. Commercially available products of the straight silicone oils are, for example, those listed below, and any one of them can be used in the present invention: KF-96-100cs, KF-96-500cs, KF-96-1000cs, KF-96-5000cs, KF-50-100cs, KF-50-300cs, KF-50-1000cs, and KF-50-3000cs (each manufactured by Shin-Etsu Chemical Co., Ltd.), TSF4300, TSF431, and TSF433 (each manufactured by Momentive Performance Materials Japan Inc.), and SH200-100CS, SH200-1000CS, SH510-100CS, and SH510-500CS (each manufactured by Dow Corning Toray Co., Ltd.). In addition, commercially available products of the modified silicone oils are, for example, those listed below, and any one of them can be used in the present invention: FZ-2104, FZ-2118, FZ-2163, FZ-2203, and FZ-2207 (each manufactured by Dow Corning Toray Co., Ltd.), TSF4452, TSF4445, and TSF4446 (each manufactured by Momentive Performance Materials Japan Inc.), and BYK-307, BYK-331, BYK-333, and BYK-347 (each manufactured by BYK-Chemie GmbH). Of course, the present invention is not limited to the foregoing.

In the present invention, the content (mass %) of the silicone oil in the first ink is preferably 0.05 mass % or more with reference to the total mass of the first ink. When the content is less than 0.05 mass %, nearly no silicone oil is present on the surface of an image formed with the ink, so the graininess of the image cannot be reduced in some cases, or the image cannot obtain sufficient water fastness in some cases. Further, in the present invention, the content (mass %) of the silicone oil in the first ink is particularly preferably 5.0 mass % or less with reference to the total mass of the first ink. When the content exceeds 5.0 mass %, both a reduction in graininess of an image formed with the ink and an improvement in water fastness of the image can be achieved, but the ink may be unable to obtain sufficient ejection stability, or orifice face wetting may occur.

Some of the above silicone oils show low solubility in water. When any such silicone oil is used, an ink can be prepared by: dissolving the silicone oil in a water-soluble organic solvent having high polarity such as acetone or methyl ethyl ketone in advance; and mixing the mixture and other components of the ink. In addition, a polyether-modified silicone oil is suitable for the preparation of an ink jet ink because the oil shows higher solubility in water than any other silicone oil does. However, the high solubility of the polyether-modified silicone oil in water facilitates the permeation of the silicone oil into a recording medium with the aqueous medium of the ink during the time period from the application of the ink to the recording medium to the formation of a pigment layer. Accordingly, the amount of the silicone oil oriented on the surface of an image formed with the ink reduces, so both a reduction in graininess of the image and an improvement in water fastness of the image may not be sufficiently achieved. In view of the foregoing, the upper limit of the HLB of the silicone oil in the first ink is preferably set to 12 or less. In addition, the lower limit of the HLB of the silicone oil is preferably set to 0 or more.

Further, the silicone oil preferably has a weight-average molecular weight of 3,000 or more and 30,000 or less. When the weight-average molecular weight is less than 3,000, the silicone oil is apt to permeate into a recording medium with the aqueous medium, with the result that the amount of the silicone oil oriented on the surface of an image formed with the ink reduces, and both a reduction in graininess of the image and an improvement in water fastness of the image may not be sufficiently achieved. On the other hand, when the weight-average molecular weight exceeds 30,000, the amount of the silicone oil oriented on the surface of the image increases, but the ink may be unable to obtain sufficient ejection stability. In the present invention, the silicone oil more preferably has a weight-average molecular weight of 5,000 or more and 20,000 or less.

<Graft Polymer>

The graft polymer used in the second ink has at least a nonionic unit represented by the following general formula (I) and a unit having a polysiloxane structure. It should be noted that the term "unit" as used in the present invention hereinafter comprehends both the case where the number of repeating units of which the unit is formed is one and the case where the number is two or more.

General Formula (I)

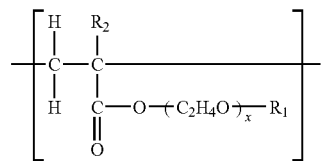

(In the general formula (I), $R_1$ and $R_2$ each independently represent a hydrogen atom or a methyl group, and x represents 1 or 2.)

In addition, the graft polymer in the present invention is a "polymer having such a structure that branch polymers (side chains) are bonded to one stem polymer (main chain)." In addition, a method of determining whether the structure of a certain polymer is that of a graft polymer is, for example, the following method. That is, whether the structure of the polymer is that of a graft polymer can be determined by measuring the absolute molecular weight and molecular size of the polymer with a combination of gel permeation chromatography and a multi-angle light scattering detector. To be specific, the absolute molecular weight and the value of the molecular size measured by such method become mutually estranged more, the degree of branching of the polymer increases, so one can conclude that the polymer has a morphology of a graft polymer.

The above graft polymer used in the second ink of the present invention is obtained by incorporating the unit having a polysiloxane structure and the above nonionic unit of a structure having hydrophilicity into the molecular structure of the polymer. Upon application of an ink containing the graft polymer of such structure to a recording medium, those units undergo a microscopic phase separation in the molecular structure of the polymer, so the molecular structure is maintained even after the application of the ink to the recording medium. Accordingly, in the case of an image recorded with the second ink, the above graft polymer is efficiently present on the surface of the recording medium. As a result, the graininess of the image is reduced, and furthermore, such combined use of the second ink containing the graft polymer and the first ink described above that the inks partly overlap each other enables the recording of an image having excellent water fastness irrespective of the kind of a recording medium.

The graft polymer used in the present invention is preferably of such a structure that the functions of the unit having a polysiloxane structure and the above nonionic unit are clearly separated from each other in each molecule of the polymer in order that the respective functions can be efficiently exerted. To be specific, the above graft polymer is preferably of such a structure that the nonionic unit and the unit having a polysiloxane structure are each included in a side chain of the polymer in order that the functions of these units can be separated from each other in an additionally clear fashion. That is, one terminal of the above nonionic unit or of the unit having a polysiloxane structure preferably forms a part of the main chain of the graft polymer. Further, the graft polymer is more preferably such that its side chains are constituted only of the above nonionic unit and the unit having a polysiloxane structure. The use of the graft polymer of such structure can provide an improving effect on the water fastness of an image formed with the ink by the unit having a polysiloxane structure and a reducing effect on the graininess of the image by the above nonionic unit in a particularly efficient fashion. In addition, not a high-molecular-weight unit but a low-molecular-weight unit is preferably used as the above nonionic unit. To be specific, the weight-average molecular weight of the above nonionic unit falls within the range of preferably 70 or more and 190 or less, or more preferably 110 or more and 190 or less. In this case, the molecules of the above nonionic unit can be caused to branch off from the main chain of the graft polymer evenly, in other words, the molecules of the above nonionic unit to branch off from the main chain can be delocalized; the delocalization is particularly effective in achieving both a reduction in graininess of an image formed with the ink and an improvement in water fastness of the image.

In the present invention, the content (mass %) of the above graft polymer in the second ink is preferably 0.5 mass % or more with reference to the total mass of the second ink. When the content is less than 0.5 mass %, nearly none of the above graft polymer is present on the surface of a recording medium, so both a reduction in graininess of an image formed with the ink and an improvement in water fastness of the image may not be sufficiently achieved. Further, in the present invention, the content (mass %) of the above graft polymer in the second ink is particularly preferably 5.0 mass % or less with reference to the total mass of the second ink. When the content exceeds 5.0 mass %, both a reduction in graininess of an image formed with the ink and an improvement in water fastness of the image can be achieved, but the ink may be unable to obtain sufficient ejection stability, or orifice face wetting may occur.

Further, investigations conducted by the inventors of the present invention have found it important for improving the water fastness of an image that a proper amount of the second ink is applied to a recording medium so that a large amount of the above graft polymer is present on the surface of the recording medium. In addition, in the present invention, the weight-average molecular weight of the above graft polymer is preferably set to fall within the range of 5,000 or more to 50,000 or less in order that a proper amount of the second ink is applied to the recording medium. When the weight-average molecular weight is higher than 50,000, the viscosity of the ink increases, so the ink cannot obtain sufficient ejection stability, a proper amount of the ink cannot be applied to the recording medium, and hence an image formed with the ink cannot obtain sufficient water fastness in some cases. In addition, when the weight-average molecular weight is lower than 5,000, the above graft polymer as well as the aqueous medium of which the ink is formed permeates into the recording medium, so the image cannot obtain sufficient water fastness in some cases.

In addition, in the present invention, it is preferred that the units of which the above graft polymer is formed further include a unit having an acidic group; and the graft polymer have an acid value of 80 mgKOH/g or more and 150 mgKOH/g or less. Examples of the unit having an acidic group include units derived from monomers each having an acidic group such as monomers each having a carboxyl group such as acrylic acid, methacrylic acid, crotonic acid, itaconic acid, maleic acid, fumaric acid, citraconic acid, and 2-methacryloyloxymethylsuccinic acid, monomers each having a sulfonic group such as styrene sulfonate, and monomers each having a phosphate group such as vinyl phosphonic acid; and the anhydrides and salts of these monomers. In addition, the acid value of the above graft polymer can be adjusted by forming the graft polymer in such a manner that the polymer contains such unit having an acidic group as described above and appropriately setting the structure and mass ratio of the unit having an acidic group. According to investigations conducted by the inventors of the present invention, when the acid value is larger than 150 mgKOH/g, the hydrophilicity of the above graft polymer becomes excessively high, so the aggregability of the polymer weakens, the above graft polymer is hard to exist on the surface of a recording medium, and hence an image formed with the ink cannot obtain sufficient water fastness in some cases. On the other hand, when the acid value is less than 80 mgKOH/g, the water solubility of the above graft polymer reduces, so the ink cannot obtain sufficient storage stability in some cases. Further, it may be difficult to maintain the ejection stability of an ink containing the above graft polymer having an acid value of less than 80 mgKOH/g upon ejection of the ink by an ink jet recording method utilizing thermal energy.

It should be noted that, when the unit having an acidic group is included in the graft polymer, the unit is preferably included in the main chain of the graft polymer, that is, the unit having an acidic group is preferably prevented from being included in side chains of the polymer. This is because when the unit having an acidic group is included in a side chain of the polymer, the action of each of the above nonionic unit and the unit having a polysiloxane structure is suppressed, so the scratch resistance and glossiness of an image formed with the ink cannot be sufficiently obtained in some cases. On the other hand, when the unit having an acidic group is included in the main chain, the action of each of the above nonionic unit and the unit having a polysiloxane structure is sufficiently exerted, whereby both the scratch resistance and glossiness of an image formed with the ink can be achieved.

Hereinafter, each unit forming the above graft polymer used in the second ink of the present invention is described in more detail.

Nonionic Unit

The nonionic unit forming the above graft polymer used in the second ink of the present invention has a structure represented by the following general formula (I). The nonionic unit of the structure is obtained by the copolymerization of a monomer represented by the following general formula (I') in which the number of repeating units, i.e., ethylene oxide groups, is 1 or 2, and the monomer has a polymerizable functional group at one of its terminals. Further, the graft polymer used in the present invention is preferably of such a structure that the vinyl group or vinylidene group of the monomer represented by the following general formula (I') serves as part of the main chain of the graft polymer, and a portion of the monomer ranging from the ester bond to $R_1$ branches off to serve as a side chain of the graft polymer.

General Formula (I)

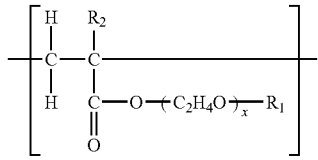

(In the general formula (I), $R_1$ and $R_2$ each independently represent a hydrogen atom or a methyl group, and x represents 1 or 2.)

General Formula (I')

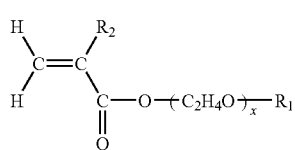

(In the general formula (I'), $R_1$ and $R_2$ each independently represent a hydrogen atom or a methyl group, and x represents 1 or 2.)

The number of repeating units, i.e., ethylene oxide groups, in the nonionic unit represented by the above general formula (I) used in the present invention needs to be 1 or 2: that is, x in the above general formula (I) needs to represent 1 or 2. When x in the above general formula (I) represents 3 or more, in the case where the nonionic unit is branched off from the main chain of the graft polymer, the sites having nonionic property tend to exist locally, so the hydrophilicity of the entirety of the above graft polymer becomes high. As a result, the water fastness of an image formed with the ink cannot be achieved. In addition, when the hydrophilicity of the entirety of the above graft polymer becomes high as described above, the graft polymer acts like a surfactant in the ink. In this case, the above graft polymer enhances the permeability of the ink into a recording medium, and hence, the amount of the above graft polymer present on the surface of the recording medium reduces, so both a reduction in graininess of an image formed with the ink and an improvement in water fastness of the image cannot be achieved.

It should be noted that, when a unit having an ethylene oxide group of a structure different from that of the nonionic unit represented by the general formula (I) is further included in the graft polymer, the number of repeating units, i.e., ethylene oxide groups, in the unit is preferably 1 or 2. This is because the water fastness of an image formed with the ink may be insufficient as in the case of x in the nonionic unit represented by the general formula (I) represents 3 or more described above.

In the present invention, the main reason why the above graft polymer having the above nonionic unit as a part of the units forming the polymer is used as the polymer used in the second ink is a reduction in graininess of an image. The inventors of the present invention have originally considered that it is satisfactory for reducing the graininess of an image that an ink containing a silicone oil is used as the first ink, and an ink containing a polymer having a polysiloxane structure is used as the second ink. Accordingly, the inventors have considered it is satisfactory to use with the first ink containing a graft polymer which has a unit having a polysiloxane structure, but which does not have the above nonionic unit. Then, the inventors have conducted investigations on an image recorded with those inks. As a result, the inventors have found that an image recorded with the second ink of such constitution shows improved water fastness, but its graininess is not reduced. In view of the foregoing, the inventors have conducted additional investigations on the polymer used in the second ink by variously changing the units of the polymer. As a result, the inventors have found that the graininess of the image can be reduced not when the polymer does not have the above nonionic unit but when the polymer has the above nonionic unit. The following description is a possible cause for the failure to reduce the graininess of an image to be obtained when the graft polymer having a unit having a polysiloxane structure is present in the ink, but does not have the above nonionic unit: whether or not the reduction is achieved is more largely affected by other units of the graft polymer than the unit having a polysiloxane structure. This phenomenon is different from that in the case of the silicone oil of the first ink, which is also a polysiloxane compound.

The nonionic unit represented by the above general formula (I) is specifically, for example, a copolymer of a (meth) acrylate-based monomer. In addition, the above graft polymer used in the present invention may be formed of one kind of such a nonionic unit as described above, or may be formed of a combination of two or more kinds of such nonionic units as described above.

Examples of the (meth)acrylate-based monomer include 2-hydroxyethyl methacrylate, diethylene glycol monomethacrylate, 2-hydroxyethyl acrylate, diethylene glycol monoacrylate, methoxydiethylene glycol monomethacrylate, and methoxydiethylene glycol monoacrylate. In the present invention, of those monomers, 2-hydroxyethyl acrylate, 2-hydroxyethyl methacrylate, and methoxydiethylene glycol monomethacrylate are preferably used. As the (meth)acrylate-based monomer, for example, commercially available products such as BLEMMER PE-90, AE-90, and PME-100 (all of which are manufactured by NOF Corporation), and BHEA and HEMA (both of which are manufactured by NIPPON SHOKUBAI CO., LTD.) can be used.

In the present invention, the proportion of the nonionic unit represented by the above general formula (I) with reference to the total mass of the above graft polymer is preferably 5.0 mass % or more and 45.0 mass % or less. When the proportion is less than 5.0 mass %, the above graft polymer shows increased hydrophobicity, and its aggregability also becomes excessively high in a recording medium, so the graininess of an image formed with the ink cannot be sufficiently reduced in many cases. On the other hand, when the proportion is larger than 45.0 mass %, the graininess of the image cannot be reduced in some cases, or the image tends to be unable to obtain sufficient water fastness. This is because when the above proportion increases, the hydrophilicity of the graft polymer increases, and the above graft polymer starts to exist stably in the ink. Accordingly, the graft polymer is apt to permeate into the recording medium, with the result that the amount of the graft polymer present on the surface of the recording medium is apt to reduce.

Unit Having Polysiloxane Structure

In the present invention, the graft polymer having the unit having a polysiloxane structure is used as the polymer used in the second ink, mainly because a polysiloxane compound is caused to exist on the surface of a recording medium so that an image formed with the ink obtains water fastness. This reason is the same as the reason why the silicone oil is incorporated into the first ink.

An arbitrary unit may be used as the unit having a polysiloxane structure forming the above graft polymer to be incorporated into the second ink as long as the unit has a polysiloxane structure. In the present invention, a unit represented by the following general formula (V) out of the units each having a polysiloxane structure is particularly preferably used. The unit represented by the general formula (V) is obtained by the copolymerization of a monomer represented by the following general formula (V') having a polymerizable functional group at one of its terminals. Further, the graft polymer used in the present invention is preferably of such a structure that the vinyl group or vinylidene group of the monomer represented by the following general formula (V') serves as part of the main chain of the graft polymer, and a portion of the monomer ranging from the ester bond to $R_{11}$ branches off to serve as a side chain of the graft polymer. In addition, the above graft polymer used in the present invention may be formed of one kind of a unit having a polysiloxane structure, or may be formed of a combination of two or more kinds of units each having a polysiloxane structure.

General Formula (V)

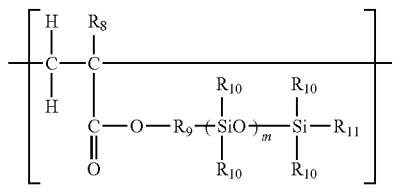

(In the general formula (V), $R_8$ represents a hydrogen atom or a methyl group, $R_9$ represents an alkylene group having 1 to 6 carbon atoms, $R_{10}$'s each independently represent a methyl group or a phenyl group, $R_{11}$ represents an alkyl group having 1 to 6 carbon atoms or a phenyl group, and m represents 1 to 150.)

General Formula (V')

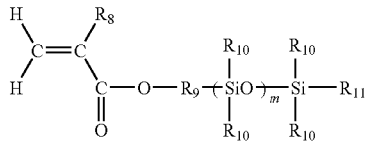

(In the general formula (V'), $R_8$ represents a hydrogen atom or a methyl group, $R_9$ represents an alkylene group having 1 to 6 carbon atoms, $R_{10}$'s each independently represent a methyl group or a phenyl group, $R_{11}$ represents an alkyl group having 1 to 6 carbon atoms or a phenyl group, and m represents 1 to 150.)

In addition, a commercially available product such as a SILAPLANE FM-0711, FM-0721, or FM-0725 (manufactured by CHISSO CORPORATION) can be used as the monomer represented by the above general formula (V').

In the present invention, the proportion of the above unit having a polysiloxane structure with reference to the total mass of the above graft polymer is preferably 10.0 mass % or more and 40.0 mass % or less. When the proportion is less than 10.0 mass %, the amount of the above graft polymer present on the surface of the recording medium reduces irrespective of the content of the graft polymer in the ink, so the image cannot obtain sufficient water fastness in some cases. On the other hand, when the above proportion is larger than 40.0 mass %, the image cannot obtain sufficient ejection stability in some cases. This is because a highly hydrophobic portion expands locally in the structure of the above graft polymer, so the above graft polymer is apt to adsorb to a member constituting a recording head, and orifice face wetting occurs in some cases.

Other Units

The above graft polymer used in the second ink needs to have at least the nonionic unit represented by the above general formula (I) and the unit having a polysiloxane structure described above, and preferably further has the unit having an acidic group. In addition, the above graft polymer used in the ink of the present invention may further have other units in addition to those units. In addition, in the present invention, by the same reason as in the case of the above-mentioned unit having an acidic group, other units are particularly preferably included in the main chain of the above graft polymer: that is, other units are particularly preferably prevented from being included in side chains of the polymer.

Other units are, for example, a copolymer of a nonionic monomer such as an ester compound. In addition, the above graft polymer used in the present invention may be formed of one kind of such other unit as described above, or may be formed of a combination of two or more kinds of such other units as described above.

Specific examples of the other unit include the units which are copolymerized form of following monomers: acrylates such as methyl acrylate, ethyl acrylate, and butyl acrylate; methacrylates such as methyl methacrylate, ethyl methacrylate, and butyl methacrylate; 3-sulfopropyl(meth)acrylate; bis-(3-sulfopropyl)itaconic ester; vinyl phosphate; bis(methacryloxyethyl)phosphate; diphenyl-2-methacryloyloxyethyl phosphate; dibutyl-2-acryloyloxyethyl phosphate; dibutyl-2-methacryloyloxyethyl phosphate; and dioctyl-2-(meth)acryloyloxyethyl phosphate. Of those, methyl acrylate, butyl acrylate, methyl methacrylate, and butyl methacrylate are preferred. It should be noted that a pigment frequently used as a coloring material for an ink jet ink is often dispersed with an anionic polymer dispersant. In consideration of the stability of an ink containing such a pigment, the units forming the graft polymer are preferably free of a unit derived from a cationic monomer capable of reacting with the polymer.

<Dispersant>

Each of the first and second inks used in the present invention contains a pigment; the pigment is preferably dispersed with a dispersant to form ink. An arbitrary polymer can be used as the dispersant for dispersing the pigment as long as the polymer has water solubility.

Such polymer is specifically, for example, a block, random, or graft copolymer synthesized from at least two monomers (at least one of which is an anionic monomer) selected from, for example, such monomers as described below and derivatives of the monomers or a salt of the copolymer. Examples of the monomers include styrene, a styrene derivative, vinylnaphthalene, a vinylnaphthalene derivative, an aliphatic alcohol ester of an α,β-ethylenic unsaturated carboxylic acid, acrylic acid, an acrylic acid derivative, maleic acid, a maleic acid derivative, itaconic acid, an itaconic acid derivative, fumaric acid, a fumaric acid derivative, and vinyl acetate. A natural resin such as rosin, shellac, or starch can also be preferably used. The polymer for dispersing the pigment in the ink is preferably alkali-soluble.

The polymer for dispersing the pigment in the ink has a weight-average molecular weight of preferably 1,000 or more and 30,000 or less, or more preferably 3,000 or more and 15,000 or less, and has an acid value of preferably 100 mgKOH/g or more and 300 mgKOH/g or less. In addition, the content (mass %) of the polymer in the ink is preferably 0.1 mass % or more and 10.0 mass % or less with reference to the total mass of the ink. In the present invention, a polymer different from the above graft polymer (which may hereinafter be referred to as "other polymer") is particularly preferably incorporated into the second ink for use as a dispersant or for any other purpose as required.

<Pigment>

Each of the first and second inks used in the present invention contains a pigment; any one of the following pigments can be used as the pigment. That is, a polymer dispersion type pigment to be dispersed with a dispersant (polymer-dispersible pigment) or a self-dispersion type pigment each particle of which has a hydrophilic group introduced onto its surface (self-dispersible pigment) can be used. Alternatively, for example, a pigment each particle of which has a polymer-containing organic group chemically bonded to its surface (polymer-bonded self-dispersible pigment) or a microcapsule type pigment the dispersibility of which is improved to such an extent that the pigment can be dispersed without using a dispersant or the like can be used. In the present invention, a pigment in the state where the pigment is dispersed with such polymer dispersant as described is particularly preferably incorporated into the second ink. Of course, two or more of those pigments to be dispersed in different ways may be used in combination. The content (mass %) of the pigment in each ink is preferably 0.1 mass % or more and 15.0 mass % or less, or more preferably 1.0 mass % or more and 10.0 mass % or less with reference to the total mass of the ink.

A pigment that can be used in preparing the first and second inks is not particularly limited, and any one of the following inorganic and organic pigments can be used; an organic pigment is particularly preferably used in the present invention.

As the inorganic pigment, it is preferred to use carbon black such as furnace black, lamp black, acetylene black, and channel black. To be specific, for example, the following commercially available products can be used:

Raven 1170, Raven 1190 ULTRA-II, Raven 1200, Raven 1250, Raven 1255, Raven 1500, Raven 2000, Raven 3500, Raven 5000 ULTRA, Raven 5250, Raven 5750, and Raven 7000 (which are manufactured by Columbia Corporation); Black Pearls L, Regal 330R, Regal 400R, Regal 660R, Mogul L, Monarch 700, Monarch 800, Monarch 880, Monarch 900, Monarch 1000, Monarch 1100, Monarch 1300, Monarch 1400, Monarch 2000, and Valcan XC-72R (which are manufactured by Cabot Corporation); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (manufactured by Degussa); No. 25, No. 33, No. 40, No. 47, No. 52, No. 900, No. 2300, MCF-88, MA 600, MA 7, MA 8, and MA 100 (manufactured by Mitsubishi Chemical Corporation). Of course, the present invention is not limited to the above carbon black.

In addition, carbon black newly prepared can also be used as the inorganic pigment. Of course, the present invention is not limited to the above carbon black, and any conventionally known carbon black can also be used. Other than carbon black, a magnetic substance fine particle such as magnetite or ferrite, titanium black, or the like may also be used as the inorganic pigment.

Specific examples of the organic pigment include: insoluble azo pigments such as toluidine red, toluidine maroon, Hansa yellow, benzidine yellow, and pyrazolone red; soluble azo pigments such as lithol red, helio bordeaux, pigment scarlet, and permanent red 2B; derivatives from vat dyes such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyranthrone-based pigments such as pyranthrone red and pyranthrone orange; indigo-based pigments; condensed azo-based pigments; thioindigo-based pigments; diketo-pyrrolo-pyrrole-based pigments; flavanthrone yellow; acylamide yellow; quinophthalone yellow; nickel azo yellow; copper azomethine yellow; perynone orange; anthrone orange; dianthraquinonyl red; and dioxazine violet. Of course, the present invention is not limited thereto.

In addition, when the organic pigment is specified with a color index (C.I.) number, the following pigments may be used, for example: C.I. Pigment Yellow: 12, 13, 14, 17, 20, 24, 74, 83, 86, 93, 97, 109, 110, and 117; C.I. Pigment Yellow: 120, 125, 128, 137, 138, 147, 148, 150, 151, 153, 154, 166, 168, 180, and 185; C.I. Pigment Orange: 16, 36, 43, 51, 55, 59, 61, and 71; C.I. Pigment Red: 9, 48, 49, 52, 53, 57, 97, 122, 123, 149, 168, and 175; C.I. Pigment Red: 176, 177, 180, 192, 215, 216, 217, 220, 223, 224, 226, 227, 228, 238, 240, 254, 255, and 272; C.I. Pigment Violet: 19, 23, 29, 30, 37, 40, and 50; C.I. Pigment Blue: 15, 15:1, 15:3, 15:4, 15:6, 22, 60, and 64; C.I. Pigment Green: 7 and 36; and C.I. Pigment Brown: 23, 25, and 26. Of course, the present invention is not limited thereto.

<Aqueous Medium>

An aqueous medium that is a mixed solvent of water and a water-soluble organic solvent can be used as a dispersion medium of the pigment in preparing the first and second inks. The content (mass %) of the water-soluble organic solvent in the ink is preferably 3.0 mass % or more and 50.0 mass % or less with reference to the total mass of the ink. It should be noted that the content of the above water-soluble organic solvent used in preparation of the second ink is a content including the specific water-soluble organic compound described below.

<Water-Soluble Organic Solvent>

The water-soluble organic solvent is not particularly limited as long as it is water soluble. One kind of the following compounds may be used, or two or more kinds of them may be used in combination. Specifically, for example, the following water-soluble organic solvents can be used: alkanediols such as 1,3-butanediol, 1,5-pentanediol, 1,2-hexanediol, and 1,6-hexanediol; glycol ethers such as diethylene glycol monomethyl (or ethyl) ether and triethylene glycol monoethyl (or butyl) ether; alkyl alcohols having 1 to 4 carbon atoms such as ethanol, isopropanol, n-butanol, isobutanol, sec-butanol, and tert-butanol; and carboxylic acid amides such as N,N-dimethyl formamide and N,N-dimethyl acetamide; ketones or ketoalcohols such as acetone, methylethyl ketone, 2-methyl-2-hydroxypentane-4-one; cyclic ethers such as tetrahydrofuran and dioxane; glycerin; ethylene glycols such as diethylene glycol, triethylene glycol, and tetraethylene glycol; polyols such as 1,2- or 1,3-propylene glycol, 1,2- or 1,4-butylene glycol, polyethylene glycol having an average molecular weight of 200 to 1,000, thiodiglycol, and 1,2,6-hexane triol; glycols such as acetylene glycol derivatives; hetrocycles such as 2-pyrrolidone, N-methyl-2-pyrrolidone, 1,3-dimethyl-2-imidazolidinone, and N-methylmorpholine; and sulfur containing compounds such as dimethylsulfoxide.

Deionized water (ion-exchanged water) is preferably used as water. The water content (mass %) in the ink is preferably 50.0 mass % or more and 95.0 mass % or less with reference to the total mass of the ink.

Water-Soluble Organic Compound Suitable for Second Ink

At least one kind of a water-soluble organic compound selected from the group consisting of compounds represented by the following general formulae (II), (III), and (IV) is preferably further incorporated into the second ink of the present invention in addition to the graft polymer described above. It should be noted that, in the following description, the water-soluble organic compound belonging to the group consisting of the compounds represented by the following general formulae (II), (III), and (IV) may be abbreviated as "specific water-soluble organic compound."

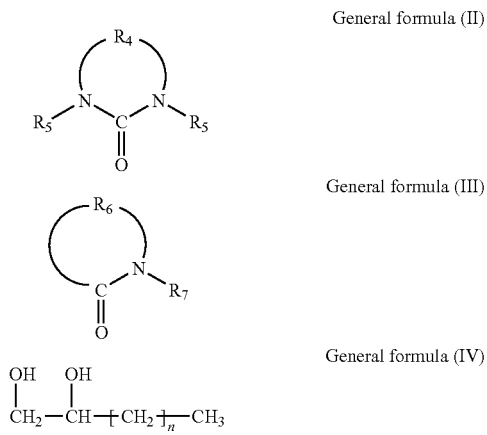

General formula (II)

General formula (III)

General formula (IV)

(In the general formula (II), $R_4$ represents an alkylene group which has 2 to 5 carbon atoms and which may have a substituent, and $R_5$'s each independently represent a hydrogen atom or an alkyl group which has 1 to 4 carbon atoms and which may have a substituent. In addition, in the general formula (III), $R_6$ represents an alkylene group which has 2 to 5 carbon atoms and which may have a substituent, and $R_7$ represents a hydrogen atom or an alkyl group which has 1 to 4 carbon atoms and which may have a substituent. In addition, in the general formula (IV), n represents a number of 1 to 3.)

Here, the reason why the above specific water-soluble organic compound is preferably further incorporated into the second ink of the present invention in addition to the above graft polymer indispensable to the present invention is described. First, as described above, it is important for achieving both a reduction in graininess of an image formed with the ink and an improvement in water fastness of the image that a proper amount of the ink is applied to a recording medium so that a large amount of the above graft polymer is present on the surface of the recording medium. In addition, the above nonionic unit forming the above graft polymer used in the second ink has high hydrophilicity, and the unit having a polysiloxane structure forming the graft polymer has high lipophilicity. Accordingly, multiple molecules of the above graft polymer may form an associated body in the ink. In addition, upon application of the ink containing the above graft polymer in such a state to the recording medium, additionally increasing the amount of the above graft polymer present on the surface of the recording medium is important for achieving both a reduction in graininess of an image formed with the ink and an improvement in water fastness of the image at a particularly excellent level.

In view of the foregoing, the inventors of the present invention have conducted investigations, and as a result, have found that reduction in graininess of an image and improvement in water fastness of the image can be achieved at a particularly excellent level by providing the ink with such a constitution that the ink contains the above graft polymer and the above specific water-soluble organic compound. In the ink of such a constitution, the associated body of the molecules of the above graft polymer is loosened. Here, a compound represented by the above general formula (II) or (III) being a nitrogen-containing heterocyclic compound has a function of loosening the associated body of the molecules of the above graft polymer in the ink, because the compound has a high affinity for the graft polymer having the hydrophilic unit and the lipophilic unit. In addition, the compound represented by the general formula (IV) being a 1,2-alkanediol acts like a surfactant, and has a function of loosening the associated body of the molecules of the above graft polymer in the ink because the compound is of such a molecular structure that a hydrophilic portion and a lipophilic portion are clearly separated from each other. In other words, via such a mechanism, upon application of the ink of the constitution to the recording medium, molecules of the above graft polymer which do not form an associated body are uniformly oriented on the surface of the recording medium with efficiency. Accordingly, both a reduction in graininess of an image formed with the ink and an improvement in water fastness of the image can be achieved at a particularly excellent level.

It should be noted that a state where the associated body of the molecules of the graft polymer is loosened in the second ink can be confirmed by measuring the dynamic surface tension of the ink. For example, the dynamic surface tension of each of an ink into which the above specific water-soluble organic compound as well as the graft polymer is incorporated and an ink into which the above specific water-soluble organic compound is not incorporated is measured at a certain life time. In this case, the ink in which the associated body of the molecules of the above graft polymer is not formed by virtue of the incorporation of the above specific water-soluble organic compound shows a lower dynamic surface tension at the life time than the ink into which the above specific water-soluble organic compound is not incorporated. This is because in the case of the ink in a state where the associated body of the molecules of the above graft polymer is loosened, a relatively large amount of molecules of the graft polymer are oriented on an interface between the ink and the air, so the dynamic surface tension of the ink reduces. In other words, when comparison between the dynamic surface tensions of those inks shows that the dynamic surface tension of the ink into which the above specific water-soluble organic compound is incorporated is lower than that of the other, it can be said that the associated body of the molecules of the above graft polymer is loosened in the ink. It should be noted that, for example, a Bubble Pressure Tensiometer BP2 (manufactured by KRUSS) can be used as an apparatus for measuring a dynamic surface tension.

The compounds represented by the general formula (II) and general formula (III) are nitrogen-containing heterocyclic compounds. Specific examples thereof include 2-pyrrolidone, N-methyl-2-pyrrolidone, 1,3-diemthyl-2-imidazolidinone, and ethylene urea. In addition, the compound represented by the general formula (IV) is 1,2-alkanediol. Specific examples thereof include 1,2-propanediol, 1,2-butanediol, 1,2-pentanediol, and 1,2-hexanediol. Of those compounds, at least one kind selected from 2-pyrrolidone, N-methyl-2-pyrrolidone, ethylene urea, and 1,2-hexanediol is particularly preferably used. Further, it is particularly preferred that the ink include at least one kind selected from 2-pyrrolidone, N-methyl-2-pyrrolidone, and ethylene urea, and 1,2-hexanediol together.

In the present invention, the total content (mass %) of the compounds represented by the above general formulae (II), (III), and (IV) in the second ink is preferably 2.0 times or more as large as the content (mass %) of the above graft polymer in the ink in terms of mass ratio, i.e. (the total content of the above specific water-soluble organic compound)/(the content of the above graft polymer) is preferably 2.0 or more. It should be noted that the content of each of the above specific water-soluble organic compound and the above graft polymer is the content of each component in the total mass of the second ink. When the mass ratio is less than 2.0, the content of the above specific water-soluble organic compound in the ink reduces, and hence, the associated body of the molecules of the above graft polymer cannot be sufficiently loosened, so both a reduction in graininess of an image formed with the ink and an improvement in water fastness of the image cannot be achieved at a particularly excellent level in some cases. In addition, the upper limit for the above mass ratio is preferably 40.0 or less, more preferably 20.0 or less, or particularly preferably 10.0 or less, especially 8.0 or less. When the upper limit for the above mass ratio is larger than 40.0, the viscosity of the ink increases, so the ink cannot obtain sufficient ejection stability. Therefore, it may be unable to apply a proper amount of the ink to a recording medium. As a result, the image may be unable to achieve both a reduction in graininess of an image formed with the ink and an improvement in water fastness of the image at a particularly excellent level in some cases.

In addition, in the present invention, the total content (mass %) of the compounds represented by the above general formulae (II), (III), and (IV) in the second ink is preferably 2.0 mass % or more with reference to the total mass of the second ink. When the content is less than 2.0 mass %, the content of the above specific water-soluble organic compound in the ink reduces, and hence, the associated body of the molecules of the above graft polymer cannot be sufficiently loosened, so both a reduction in graininess of an image formed with the ink and an improvement in water fastness of the image cannot be achieved at a particularly excellent level in some cases. In addition, the upper limit of the content of the above specific water-soluble organic compound is preferably 20.0 mass % or less. When the upper limit for the content is larger than 20.0 mass %, the viscosity of the ink increases, so the ink cannot obtain sufficient ejection stability. Therefore, it may be unable to apply a proper amount of the ink to a recording medium. As a result, the image may be unable to achieve both a reduction in graininess of an image formed with the ink and an improvement in water fastness of the image at a particularly excellent level in some cases.

<Any Other Component>

In addition to the above components, a moisture-retaining solid component such as urea, a urea derivative, trimethylolpropane, or trimethylolethane may be incorporated into the first and second inks of the ink set of the present invention. The content (mass %) of the moisture-retaining solid component in the ink is preferably 0.1 mass % or more and 20.0 mass % or less, or more preferably 3.0 mass % or more and 10.0 mass % or less with reference to the total mass of the ink.

Further, various additives such as a pH adjustor, a rust inhibitor, an antiseptic, a mildew-proofing agent, an antioxidant, and an anti-reducing agent may be incorporated into the ink of the present invention as required in order that the ink may have desired physical property values.

<Ink Jet Recording Method>

An ink jet recording method of the present invention involves ejecting the first and second inks of the ink set described above according to an ink jet system to apply the first and second inks to a recording medium so that the inks overlap each other at least partly. Examples of the ink jet recording method include a recording method involving applying mechanical energy to ink to eject the ink and a recording method involving applying thermal energy to ink to eject the ink. An ink jet recording method involving the utilization of thermal energy can be particularly preferably used in the present invention.

Investigations conducted by the inventors of the present invention have found that proper determination of the amount of each of the first and second inks to be applied to a recording medium suffices to achieve both a reduction in graininess of an image formed with the inks and an improvement in water fastness of the image at an additionally excellent level. For example, when the application amount of one of the first and second inks is extremely small or extremely large in a secondary color image recorded by causing these inks to overlap each other, both a reduction in graininess of the image and an improvement in water fastness of the image cannot be achieved at an additionally excellent level in some cases. That is, when the first ink and the second ink are extremely different from each other in application amount, the image may be brought into substantially the same state as that of a secondary color image recorded by causing the multiple first inks to overlap each other or of a secondary color image recorded by causing the multiple second inks to overlap each other. Accordingly, both a reduction in graininess of the image and an improvement in water fastness of the image cannot be achieved at an additionally excellent level in some cases. In the present invention, the ratio between the application amount of the first ink and the application amount of the second ink (mass ratio) is preferably 1:50 to 50:1.

<Ink Cartridge>

Each of the first and second inks of the ink set of the present invention is preferably stored in an ink storage portion for storing ink in an ink cartridge.

<Recording Unit>

Each of the first and second inks of the ink set of the present invention is preferably stored in an ink storage portion for storing ink in a recording unit provided with the ink storage portion and a recording head for ejecting the ink. The recording unit in which the recording head applies thermal energy corresponding to a recording signal to the ink to eject the ink can be particularly preferably used. Further, in the present invention, a recording head having a heat-generating portion liquid-contacting surface containing at least one of a metal and a metal oxide is particularly preferably used. Specific examples of at least one of the metal and the metal oxide forming the heat-generating portion liquid-contacting surface include metals such as Ta, Zr, Ti, Ni, and Al, and oxides of these metals.

<Ink Jet Recording Apparatus>

An ink jet recording apparatus of the present invention has an ink storage portion for storing each of the first and second inks described above of the ink set having the inks independently, and performs recording on a recording medium by ejecting each of these inks from a recording head. In addition, the apparatus is so constructed that the first and second inks are applied to the recording medium so as to overlap each other at least partly.

To be more specific, each ink of the ink set of the present invention is stored in an ink storage portion for storing the ink of an ink jet recording apparatus provided with the ink storage portion and a recording head for ejecting the ink. An ink jet recording apparatus of such a system that thermal energy corresponding to a recording signal is applied to the ink in a recording head having the ink storage portion for storing the ink to eject the ink is particularly preferably used.

Hereinafter, the schematic constitution of the mechanism portion of an exemplary ink jet recording apparatus of the present invention is described. The ink jet recording apparatus is formed of, for example, a sheet feeding portion, a conveying portion, a carriage portion, a sheet discharge portion, and a cleaning portion, and an external packaging portion for protecting them and providing them with a design to achieve a role of each mechanism.

Figure 2:
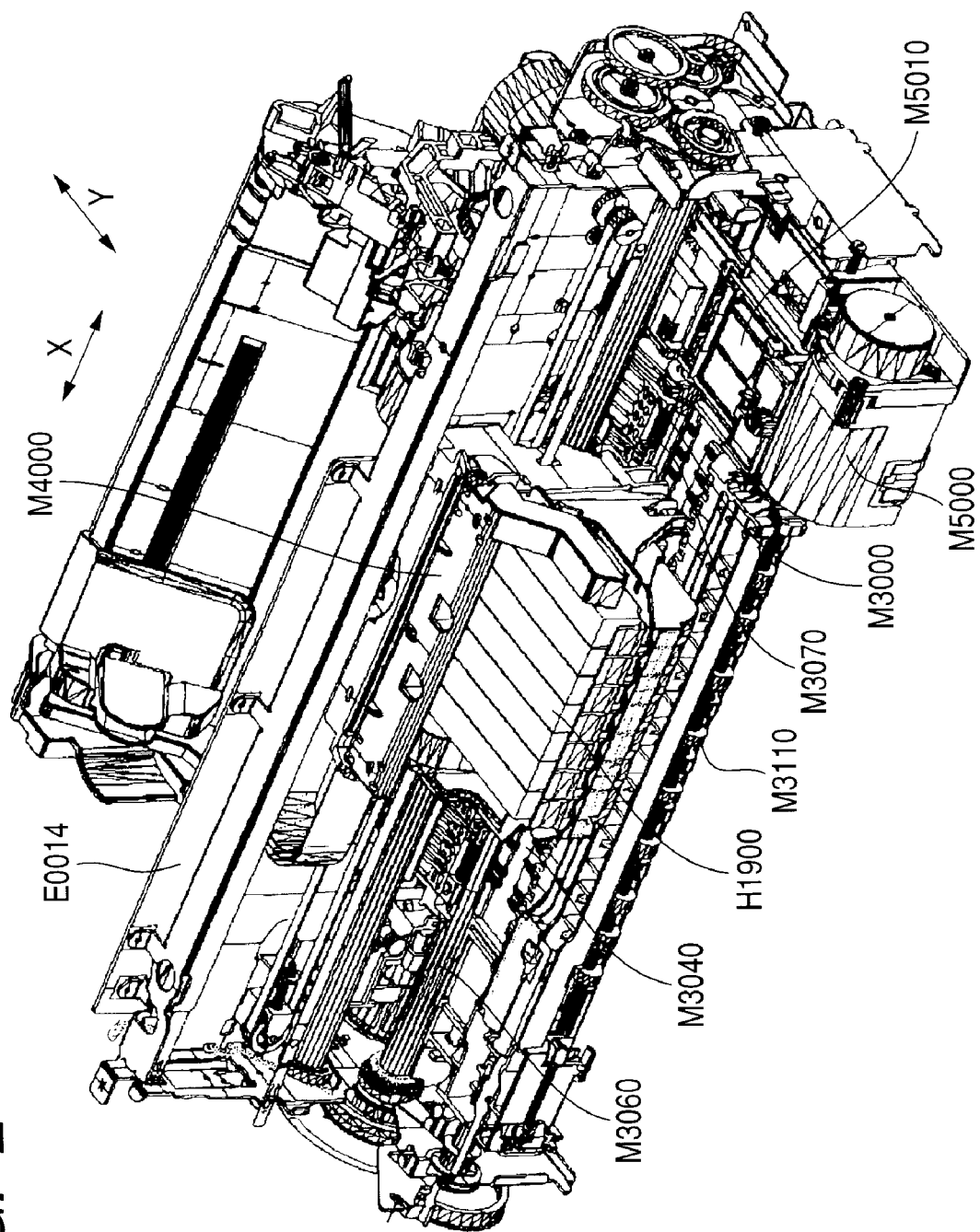
FIG. 2 is a perspective view of the mechanism portion of the ink jet recording apparatus.
Figure 3:
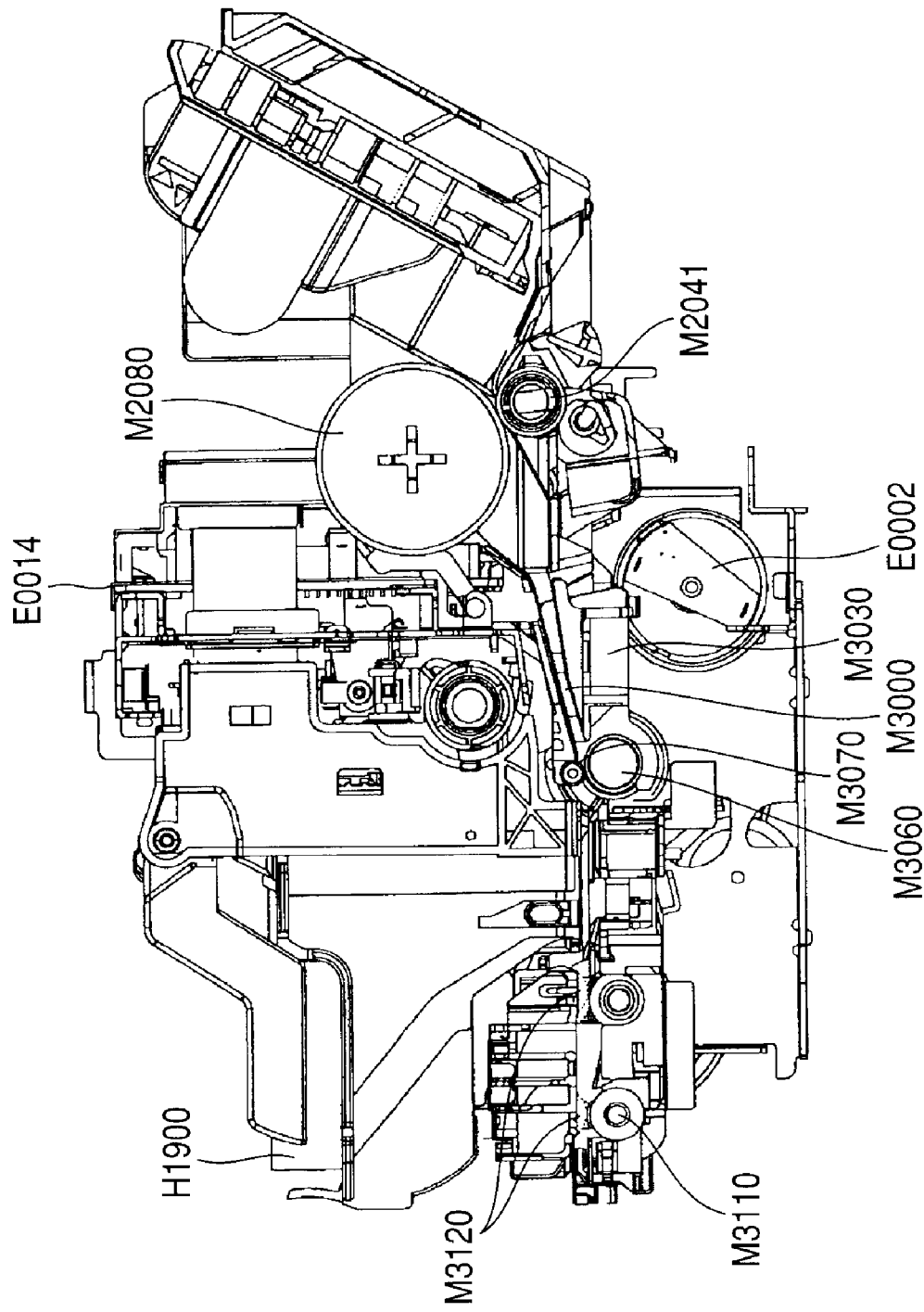
FIG. 3 is a sectional view of the ink jet recording apparatus.

FIG. 1 is a perspective view of the ink jet recording apparatus. In addition, FIGS. 2 and 3 are views for describing the internal mechanism of the ink jet recording apparatus. FIG. 2 is a perspective view seen from an upper right portion, and FIG. 3 is a side sectional view of the ink jet recording apparatus.

Upon feeding of a sheet, only a predetermined number of recording media are sent to a nip portion formed of a sheet feeding roller M2080 and a separating roller M2041 in the sheet feeding portion including a sheet feeding tray M2060. The sent recording media are separated at the nip portion, and only the uppermost recording medium is conveyed. The recording medium conveyed to the conveying portion is guided by a pinch roller holder M3000 and a paper guide flapper M3030 to be conveyed to a roller pair formed of a conveying roller M3060 and a pinch roller M3070. The driving of an LF motor E0002 rotates the roller pair formed of the conveying roller M3060 and the pinch roller M3070, and the rotation causes the recording medium to be conveyed on a platen M3040.

Upon recording of an image on a recording medium, the carriage portion places a recording head H1001 (FIG. 4; a detailed constitution is described later) at a position where a target image is recorded, and ejects ink to the recording medium in accordance with a signal from an electrical substrate E0014. While recording is performed by the recording head H1001, main scanning in which a carriage M4000 scans in a column direction and sub-scanning in which a recording medium is conveyed in a row direction by the conveying roller M3060 are alternately repeated, whereby an image is recorded on the recording medium. The recording medium on which the image has been recorded is conveyed in a state of being sandwiched at a nip between a first sheet discharge roller M3110 and a spur M3120, and is discharged to a sheet discharge tray M3160 in the sheet discharge portion.

It should be noted that the cleaning portion cleans the recording head H1001 before and after image recording. When a pump M5000 is caused to act in a state where an ejection orifice of the recording head H1001 is capped with a cap M5010, unnecessary ink and the like are sucked from the ejection orifice of the recording head H1001. In addition, the ink and the like remaining in the cap M5010 are sucked with the cap M5010 opened, whereby neither adhesion of the remaining ink nor any other trouble occurs.

<Constitution of Recording Head>

Figure 4:
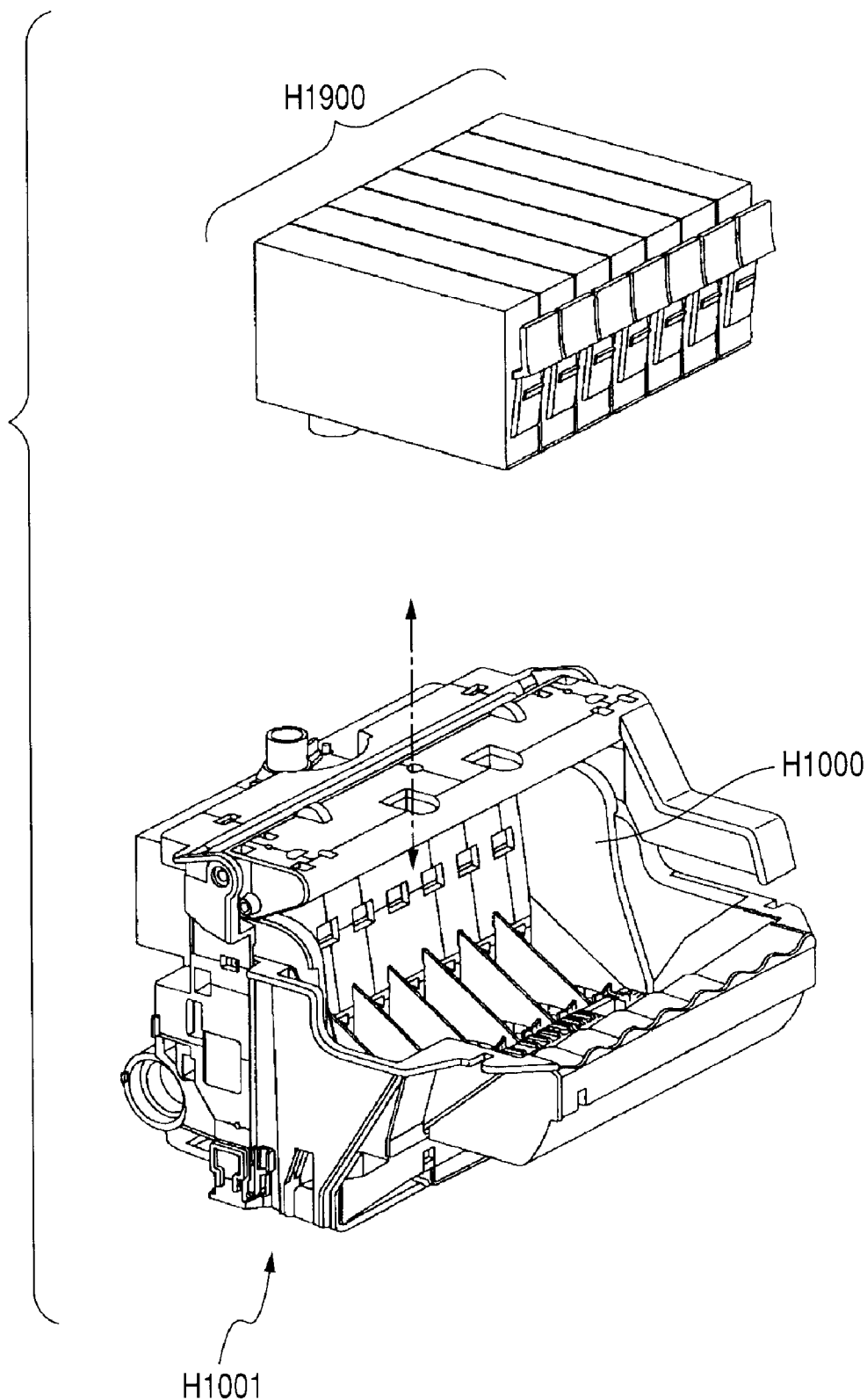
FIG. 4 is a perspective view illustrating a state where an ink cartridge is mounted on a head cartridge.

The constitution of a head cartridge H1000 is described. FIG. 4 is a view illustrating the constitution of the head cartridge H1000, and is a view illustrating how ink cartridges H1900 are mounted on the head cartridge H1000. The head cartridge H1000 has the recording head H1001, a unit for mounting the ink cartridges H1900, and a unit for supplying ink from the ink cartridges H1900 to the recording head, and is attachably and detachably mounted on the carriage M4000.

The ink jet recording apparatus records an image with yellow, magenta, cyan, black, pale magenta, pale cyan, and green inks. Therefore, the ink cartridges H1900 are independently prepared for seven colors. It should be noted that each of the inks of which the ink set of the present invention is formed is used as at least two of the above inks. In addition, as illustrated in FIG. 4, each of the ink cartridges H1900 is attachable and detachable to the head cartridge H1000. It should be noted that the ink cartridges H1900 can be attached and detached in a state where the head cartridge H1000 is mounted on the carriage M4000.

Figure 5:
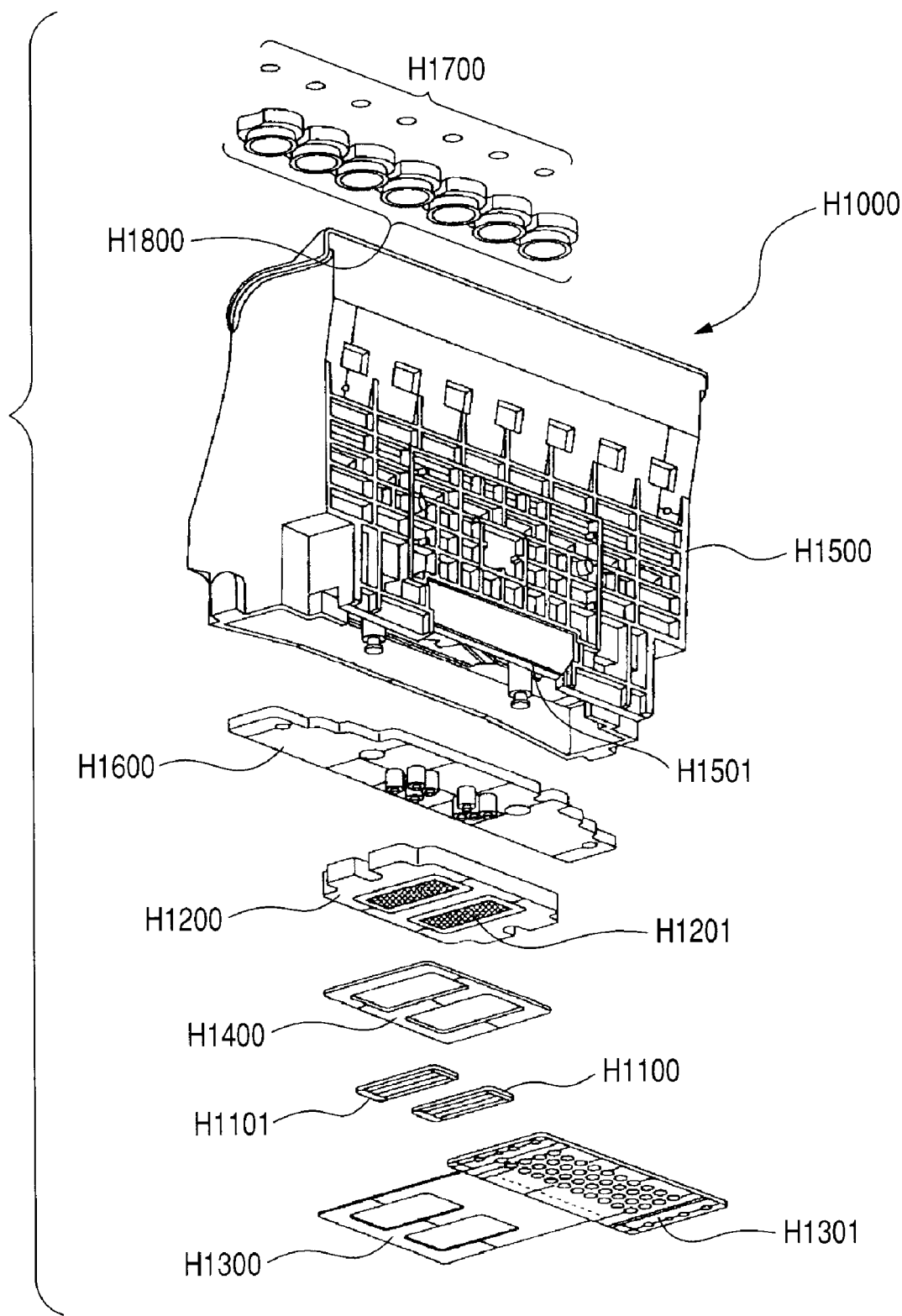
FIG. 5 is an exploded perspective view of the head cartridge.

FIG. 5 is an exploded perspective view of the head cartridge H1000. The head cartridge H1000 is formed of, for example, recording element substrates, plates, an electric wiring substrate H1300, a cartridge holder H1500, a flow path forming member H1600, a filter H1700, and a seal rubber H1800. The recording element substrates are formed of a first recording element substrate H1100 and a second recording element substrate H1101, and the plates are formed of a first plate H1200 and a second plate H1400.

Each of the first recording element substrate H1100 and the second recording element substrate H1101 is an Si substrate having multiple recording elements (nozzles) for ejecting ink formed on one of its surfaces by photolithography. Electric wiring made of Al or the like for supplying power to each recording element is formed by a film formation technique, and multiple ink flow paths corresponding to the individual recording elements are also formed by photolithography. Further, ink supply orifices for supplying ink to the multiple ink flow paths are formed so as to open on the rear surface of each substrate.

Figure 6:
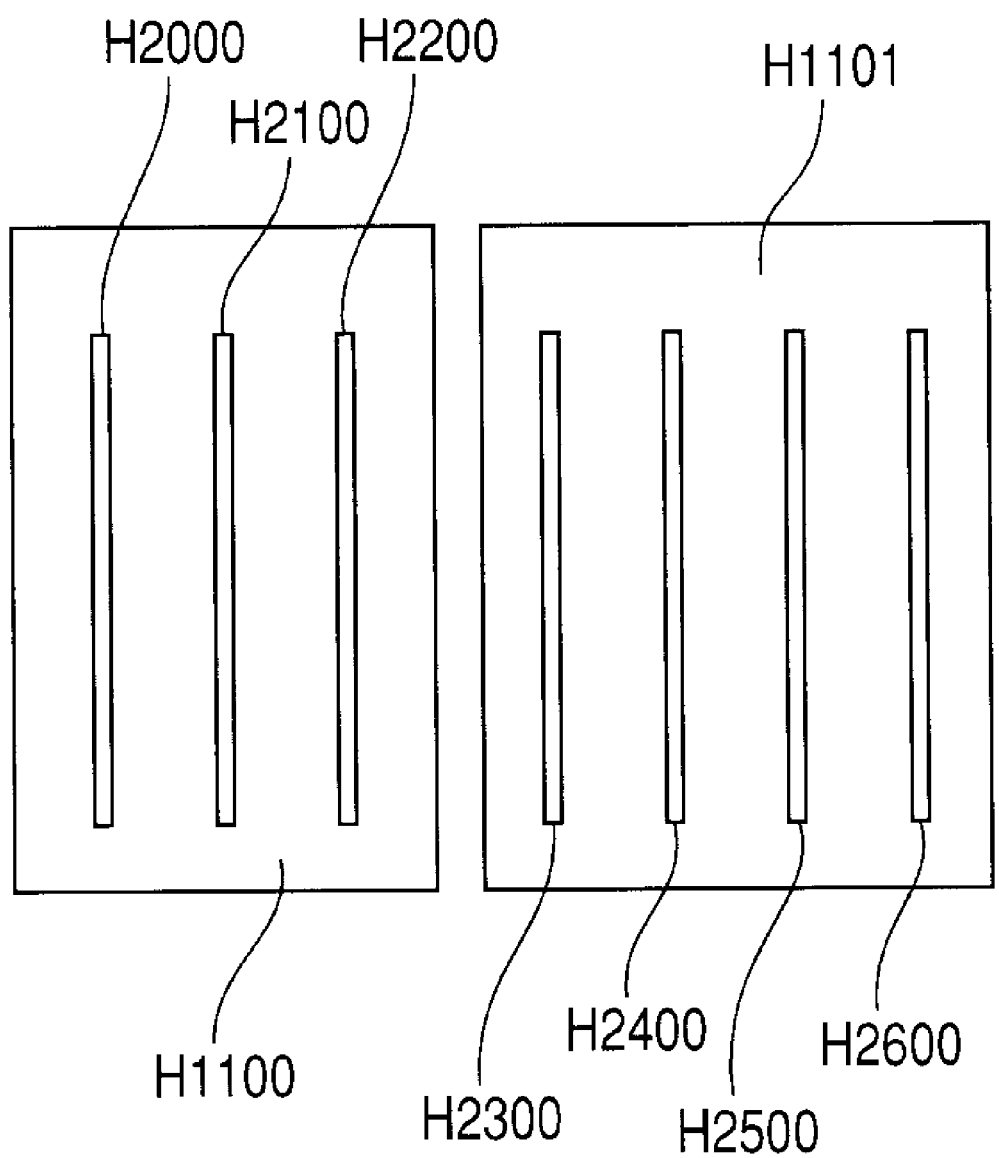
FIG. 6 is a front view illustrating recording element substrates in the head cartridge.

FIG. 6 is an enlarged front view for describing the constitution of each of the first recording element substrate H1100 and the second recording element substrate H1101. Reference symbols H2000 to H2600 represent recording element trains (which may hereinafter be referred to as "nozzle trains") corresponding to different ink colors. The first recording element substrate H1100 has nozzle trains for three colors formed in itself: the nozzle train H2000 for the yellow ink, the nozzle train H2100 for the magenta ink, and the nozzle train H2200 for the cyan ink. The second recording element substrate H1101 has nozzle trains for four colors formed in itself: the nozzle train H2300 for the pale cyan ink, the nozzle train H2400 for the black ink, the nozzle train H2500 for the green ink, and the nozzle train H2600 for the pale magenta ink.

Each nozzle train is formed of 768 nozzles arranged at an interval of 1,200 dpi (dot/inch; reference value) in the direction in which a recording medium is conveyed (sub-scanning direction). In addition, each nozzle ejects about 2 pl of ink. Accordingly, an opening area in each ejection orifice is set to about 100 µm².

Hereinafter, description is given with reference to FIGS. 4 and 5. The first recording element substrate H1100 and the second recording element substrate H1101 are bonded and fixed to the first plate H1200. Ink supply orifices H1201 for supplying ink to the first recording element substrate H1100 and the second recording element substrate H1101 are formed in the first plate H1200. Further, the second plate H1400 having openings is bonded and fixed to the first plate H1200. The second plate H1400 holds the electric wiring substrate H1300 so that the electric wiring substrate H1300, the first recording element substrate H1100, and the second recording element substrate H1101 are electrically connected.

The electric wiring substrate H1300 applies an electrical signal for causing each of the nozzles formed on the first recording element substrate H1100 and the second recording element substrate H1101 to eject ink. The electric wiring substrate H1300 has: electric wiring corresponding to each of the first recording element substrate H1100 and the second recording element substrate H1101; and an external signal input terminal H1301 which is positioned at an end portion of the electric wiring to receive an electrical signal from the ink jet recording apparatus. The external signal input terminal H1301 is positioned and fixed to the back surface side of the cartridge holder H1500.

The flow path forming member H1600 is fixed by, for example, ultrasonic welding to the cartridge holder H1500 that holds the ink cartridges H1900. Thus, an ink flow path H1501 passing from the ink cartridges H1900 to the first plate H1200 is formed. The filter H1700 is provided for an end portion on the ink cartridge side of the ink flow path H1501 engaged with the ink cartridges H1900, so the filter H1700 can prevent dust from entering from the outside to the ink flow path H1501. In addition, the seal rubber H1800 is mounted on the portion at which the ink flow path H1501 is engaged with the ink cartridges H1900 so as to be capable of preventing ink from evaporating from the portion.

Further, as described above, the head cartridge H1000 is formed by connecting a cartridge holder portion and the recording head portion H1001 through bonding or the like. It should be noted that the cartridge holder portion is formed of the cartridge holder H1500, the flow path forming member H1600, the filter H1700, and the seal rubber H1800. In addition, the recording head portion H1001 is formed of the first recording element substrate H1100 and the second recording element substrate H1101, the first plate H1200, the electric wiring substrate H1300, and the second plate H1400.

It should be noted that description has been given here by taking, as an embodiment of a recording head, a recording head according to a thermal ink jet system that performs recording with an electrothermal transducer (recording element) which generates thermal energy for causing ink to generate film boiling in accordance with an electrical signal. With regard to the representative constitution and principle of the system, it is preferably performed on the basis of basic principles disclosed in, for example, U.S. Pat. No. 4,723,129 and U.S. Pat. No. 4,740,796. This system is applicable to any one of the so-called on-demand type and continuous type recording heads.

Particularly effective is the application of the thermal ink jet system to the on-demand type recording head. In the case of the on-demand type recording head, at least one driving signal which corresponds to recording information and which causes a sudden increase in temperature exceeding nuclear boiling is applied to an electrothermal transducer placed in correspondence with a liquid flow path that holds ink. Thus, the electrothermal transducer is caused to generate thermal energy, and the ink is caused to generate film boiling, whereby an air bubble in the ink can be formed so as to be in one-to-one correspondence with the driving signal. The growth and contraction of the air bubble result in the ejection of the ink through an ejection orifice, whereby at least one droplet is formed. The driving signal is more preferably of a pulse shape because the growth and contraction of an air bubble are performed immediately and properly, so the ejection of the ink particularly excellent in responsiveness can be performed.

In addition, each of the inks of which the ink set of the present invention is formed can be preferably used in such an ink jet recording apparatus utilizing mechanical energy as described below as well as in an ink jet recording apparatus according to the thermal ink jet system. The ink jet recording apparatus includes a nozzle forming substrate having multiple nozzles, a pressure generating element which is placed so as to be opposed to the nozzles and which is formed of a piezoelectric material and a conductive material, and ink filling the surroundings of the pressure generating element, and the pressure generating element is displaced by an applied voltage so that the ink is ejected from each nozzle.

The ink jet recording apparatus is not limited to the apparatus as described above in which a recording head and an ink cartridge are separated, and an apparatus in which the recording head and the ink cartridge are integrated so as to be unseparable may be used as the apparatus. Further, the ink cartridge may be separably or unseparably integrated with the recording head to be mounted on the carriage, or may be provided for a fixing site of the ink jet recording apparatus to supply ink to the recording head through an ink supply member such as a tube. In addition, when the ink cartridge is provided with a constitution for applying a preferable negative pressure to the recording head, for example, the following constitution can be adopted: an absorber is placed in an ink storage portion of the ink cartridge, or the ink cartridge has a flexible ink storage bag and a spring portion that applies, to the bag, a bias in the direction in which the internal volume of the bag is expanded. In addition, the ink jet recording apparatus may adopt such a serial recording mode as described above, or may be in the form of a line printer obtained by aligning recording elements over the range corresponding to the entire width of a recording medium.

EXAMPLES

Hereinafter, the present invention is described more specifically by way of examples and comparative examples. However, the present invention is by no means limited by the following examples unless going beyond the gist of the present invention. It should be noted that the terms "part(s)" and "%" mean "part(s) by mass" and "mass %", respectively unless otherwise stated.

<Preparation of Pigment Dispersion Liquid>

12 parts of a pigment (C.I. Pigment Blue 15:3), 12 parts of a polymer (dispersant), and 76 parts of water were loaded into a sand mill (manufactured by KANEDA SCIENTIFIC CO., LTD.) filled with zirconia beads having a diameter of 0.6 mm at a ratio of 70%, and were then subjected to dispersion treatment for 5 hours. A polymer containing styrene and acrylic acid at a copolymerization ratio (mass ratio) of 70:30 and having a weight-average molecular weight of 5,000 and an acid value of 240 mgKOH/g was used as the polymer. It should be noted that the polymer was used in the form of an aqueous solution prepared in advance by adding potassium hydroxide in an amount equivalent to the above acid value and water to the polymer; and stirring the mixture at a temperature of 80° C. After that, the dispersed product was centrifuged at 5,000 rpm for 10 minutes so that aggregated components are removed. Further, the remainder was diluted with water so that the concentrations of the pigment and the polymer were respectively adjusted to be 10.0% and 10.0%. Thus, a pigment dispersion liquid was obtained.

<Synthesis of Silicone Oils>

Silicone Oils 1 to 6 were synthesized in accordance with the following synthesis examples.

(Synthesis of Silicone Oil 1)

Silicone Oil 1 was synthesized with a glass container provided with a temperature gauge and a stirring unit as described below. A siloxane compound represented by the following formula (A), a siloxane compound represented by the following formula (B), and a siloxane compound represented by the following formula (C) were subjected to a polymerization reaction in the container at a molar ratio of 1:9:2 in the presence of potassium hydroxide, whereby Silicone Oil 1 was synthesized. Silicone Oil 1 thus obtained was a compound represented by the following formula (1) in which R represented a phenyl group, m represented 4, and n represented 6. Silicone Oil 1 had a weight-average molecular weight of 5,100 and an HLB of 0 (theoretical value).

Formula (A)

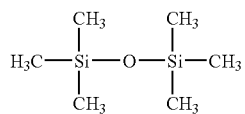

Formula (B)

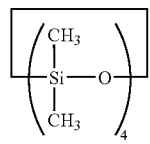

Formula (C)

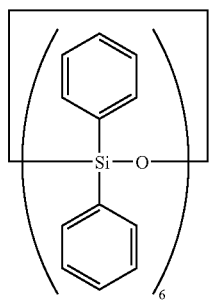

Formula (1)

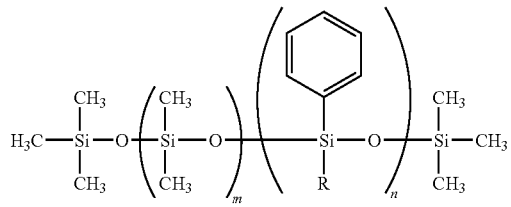

(In the formula (1), R represents a methyl group or a phenyl group, m represents 1 or more and 670 or less, and n represents 0 or more and 200 or less.)

(Synthesis of Silicone Oil 2)

Silicone Oil 2 was synthesized with a glass container provided with a temperature gauge and a stirring unit as described below. A polysiloxane compound represented by the following formula (D) and a polyoxyethylene compound represented by the following formula (E) were subjected to an addition reaction in the container in the presence of a platinum catalyst, whereby Silicone Oil 2 was synthesized. Silicone Oil 2 thus obtained was a compound represented by the following formula (2) in which $R_1$ represented a propylene group, $R_2$ represented a hydrogen atom, m represented 122, n represented 30, a represented 5, and b represented 0. Silicone Oil 2 had a weight-average molecular weight of 20,000 and an HLB of 7 (theoretical value).

Formula (D)

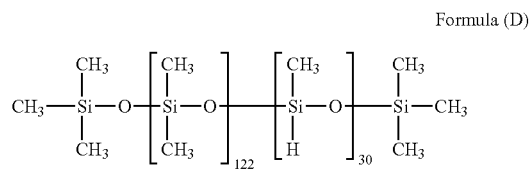

Formula (E)

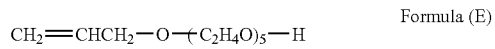

Formula (2)

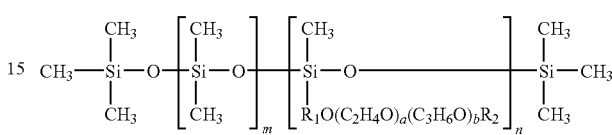

(In the formula (2), $R_1$ represents an alkylene group having 1 to 20 carbon atoms, $R_2$ represents a hydrogen atom or an alkyl group having 1 to 20 carbon atoms, m represents 1 or more and 250 or less, n represents 1 or more and 100 or less, a represents 1 or more and 100 or less, and b represents 0 or more and 100 or less.)

(Synthesis of Silicone Oil 3)

Silicone Oil 3 was synthesized with a glass container provided with a temperature gauge and a stirring unit as described below. A polysiloxane compound represented by the following formula (F) and a polyoxyethylene compound represented by the following formula (G) were subjected to an addition reaction in the container in the presence of a platinum catalyst, whereby Silicone Oil 3 was synthesized. Silicone Oil 3 thus obtained was a compound represented by the above formula (2) in which $R_1$ represented a propylene group, $R_2$ represented a hydrogen atom, m represented 14, n represented 3, a represented 6, and b represented 0. Silicone Oil 3 had a weight-average molecular weight of 2,500 and an HLB of 7 (theoretical value).

Formula (F)

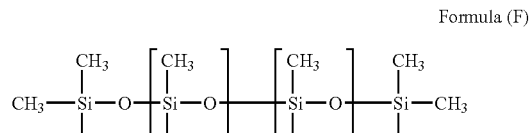

Formula (G)

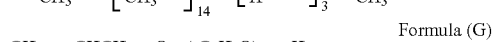

(Synthesis of Silicone Oil 4)

Silicone Oil 4 was synthesized with a glass container provided with a temperature gauge and a stirring unit as described below. A polysiloxane compound represented by the following formula (H) and a polyoxyethylene compound represented by the following formula (E) were subjected to an addition reaction in the container in the presence of a platinum catalyst, whereby Silicone Oil 4 was synthesized. Silicone Oil 4 thus obtained was a compound represented by the above formula (2) in which $R_1$ represented a propylene group, $R_2$ represented a hydrogen atom, m represented 17, n represented 5, a represented 5, and b represented 0. Silicone Oil 4 had a weight-average molecular weight of 3,000 and an HLB of 7 (theoretical value).

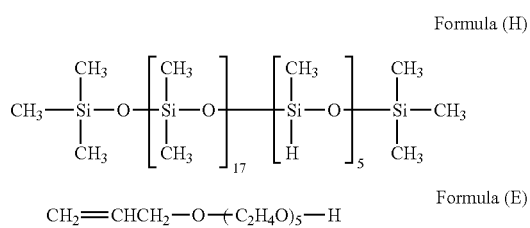

Formula (H)

Formula (E)

(Synthesis of Silicone Oil 5)

Silicone Oil 5 was synthesized with a glass container provided with a temperature gauge and a stirring unit as described below. A polysiloxane compound represented by the following formula (I) and a polyoxyethylene compound represented by the following formula (J) were subjected to an addition reaction in the container in the presence of a platinum catalyst, whereby Silicone Oil 5 was synthesized. Silicone Oil 5 thus obtained was a compound represented by the above formula (2) in which $R_1$ represented a propylene group, $R_2$ represented a hydrogen atom, m represented 218, n represented 26, a represented 9, and b represented 0. Silicone Oil 5 had a weight-average molecular weight of 30,000 and an HLB of 7 (theoretical value).

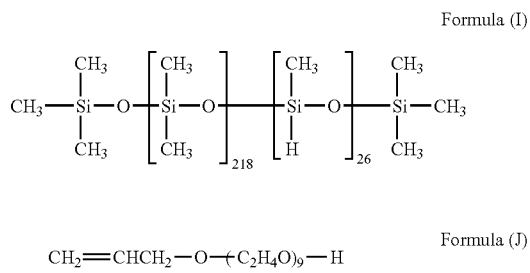

Formula (I)

Formula (J)

(Synthesis of Silicone Oil 6)

Silicone Oil 6 was synthesized with a glass container provided with a temperature gauge and a stirring unit as described below. A polysiloxane compound represented by the following formula (K) and a polyoxyethylene compound represented by the following formula (L) were subjected to an addition reaction in the container in the presence of a platinum catalyst, whereby Silicone Oil 6 was synthesized. Silicone Oil 6 thus obtained was a compound represented by the above formula (2) in which $R_1$ represented a propylene group, $R_2$ represented a hydrogen atom, m represented 261, n represented 27, a represented 10, and b represented 0. Silicone Oil 6 had a weight-average molecular weight of 35,000 and an HLB of 7 (theoretical value).

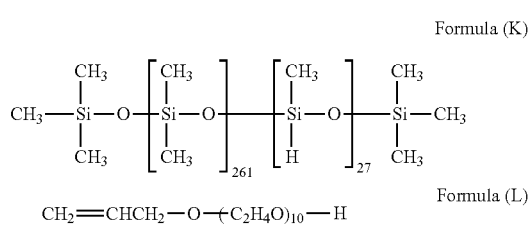

Formula (K)

Formula (L)

<Synthesis of Silicone Graft Polymer>

Graft Polymers 1 to 23 being silicone graft polymers were each synthesized in accordance with the following procedure. It should be noted that a conventionally known polymerization method can be employed as a method for the synthesis. In the examples, Graft Polymers 1 to 23 were each synthesized by employing the following polymerization method. First, a monomer and azobisisobutyronitrile were loaded into a flask provided with a stirring machine, a temperature gauge, and a nitrogen-introducing pipe according to the composition shown in Table 1 below, and the mixture was subjected to a polymerization reaction with 500 parts of 1-methoxy-2-propanol as a solvent under nitrogen gas reflux at a temperature of 110° C. for 4 hours. The solution containing a copolymer thus obtained was dried under reduced pressure, whereby the copolymer was obtained. After 25 parts of methyl ethyl ketone were added as a solvent to dissolve the resultant copolymer, 2 parts of a 30% aqueous solution of potassium hydroxide was added to the solution to neutralize part of the salt-generating groups of the copolymer. Further, 300 parts of ion-exchanged water was added to the mixture, and the whole was stirred. After that, the solvent was removed under reduced pressure at a temperature of 60° C., and furthermore, the residue was concentrated by removing part of water, whereby a graft polymer as an aqueous solution having a solid concentration of 20.0% was obtained. The absolute molecular weight and molecular size of each of Graft Polymers 1 to 23 thus obtained were measured with a combination of a gel permeation chromatography apparatus (manufactured by Shimadzu Corporation) and a multi-angle light scattering detector (manufactured by SHOKO Co.). As a result, in each of the measurements of the graft polymers 1 to 23, the absolute molecular weight and the measured value of the molecular size were largely mutually estranged, and from the structures of the monomers used it was confirmed that each of the graft polymers was of such a structure that a unit having a polysiloxane structure and a nonionic unit branched off from the main chain of the graft polymer to serve as side chains.

It should be noted that '(*1)' to '(*6)' in Table 1 below represent the following monomers.

(*1): SILAPLANE FM-0711 (manufactured by CHISSO CORPORATION; a monomer having a polysiloxane structure represented by the general formula (V') with a number-average molecular weight of about 1,000)

(*2): BHEA (product name: manufactured by NIPPON SHOKUBAI CO., LTD.; a nonionic monomer represented by the general formula (I') in which $R_1$ and $R_2$ each represent a hydrogen atom and x represents 1)

(*3): HEMA (product name: manufactured by NIPPON SHOKUBAI CO., LTD.; a nonionic monomer represented by the general formula (I') in which $R_1$ represents a hydrogen atom, $R_2$ represents a methyl group and x represents 1)

(*4): BLEMMER PME-100 (product name: manufactured by NOF Corporation; a nonionic monomer represented by the general formula (I') in which $R_1$ and $R_2$ each represent a methyl group and x represents 2)

(*5): BLEMMER PME-200 (product name: manufactured by NOF Corporation; a nonionic monomer represented by the general formula (I') in which $R_1$ and $R_2$ each represent a methyl group and x represents about 4)

(*6): BLEMMER PME-1000 (product name: manufactured by NOF Corporation; a nonionic monomer represented by the general formula (I') in which $R_1$ and $R_2$ each represent a methyl group and x represents about 23)

TABLE 1

Composition and characteristics of graft polymer

| | | Graft Polymer No. | | | | | |
|---|---|---|---|---|---|---|---|
| | | 1 | 2 | 3 | 4 | 5 | 6 |
| Monomer [part] | Monomer having polysiloxane structure (*1) | 20.0 | 20.0 | 20.0 | 20.0 | 10.0 | 40.0 |
| | 2-hydroxyethyl acrylate (*2) | 25.0 | | | | | |
| | 2-hydroxyethyl methacrylate (*3) | 5.0 | | 5.0 | 5.0 | 5.0 | 5.0 |
| | Methoxydiethylene glycol monomethacrylate (*4) | | 24.0 | 25.0 | 26.0 | 26.0 | 24.0 |
| | Methoxypolyethylene glycol monomethacrylate (*5) | | | | | | |
| | Methoxypolyethylene glycol monomethacrylate (*6) | | | | | | |
| | Acrylic acid | 13.0 | 13.0 | 13.0 | 13.0 | 13.0 | 13.0 |
| | Methyl methacrylate | 19.0 | 19.0 | 19.0 | 18.0 | 23.0 | 9.0 |
| | Butyl methacrylate | 18.0 | 19.0 | 18.0 | 18.0 | 23.0 | 9.0 |
| Polymerization initiator [part] | Azobisisobutyronitrile | 4.0 | 4.0 | 1.5 | 6.0 | 4.0 | 4.0 |
| Characteristics | Weight-average molecular weight | 15,500 | 15,800 | 50,000 | 5,000 | 15,500 | 15,900 |
| | Acid value [mgKOH/g] | 100 | 99 | 98 | 100 | 98 | 99 |
| | Proportion of unit having polysiloxane structure [%] | 20.0 | 20.0 | 20.0 | 20.0 | 10.0 | 40.0 |
| | Proportion of nonionic unit [%] | 30.0 | 29.0 | 30.0 | 31.0 | 31.0 | 29.0 |

| | | Graft Polymer No. | | | | | |
|---|---|---|---|---|---|---|---|
| | | 7 | 8 | 9 | 10 | 11 | 12 |
| Monomer [part] | Monomer having polysiloxane structure (*1) | 20.0 | 20.0 | 20.0 | 20.0 | 50.0 | 20.0 |
| | 2-hydroxyethyl acrylate (*2) | | | | | | |
| | 2-hydroxyethyl methacrylate (*3) | 0.8 | 7.5 | 5.0 | 5.0 | 7.0 | 5.0 |
| | Methoxydiethylene glycol monomethacrylate (*4) | 4.2 | 37.5 | 26.0 | 25.0 | 30.0 | 24.0 |
| | Methoxypolyethylene glycol monomethacrylate (*5) | | | | | | |
| | Methoxypolyethylene glycol monomethacrylate (*6) | | | | | | |
| | Acrylic acid | 13.0 | 13.0 | 10.0 | 22.0 | 13.0 | 13.0 |
| | Methyl methacrylate | 30.0 | 12.0 | 20.0 | 14.0 | | 19.0 |
| | Butyl methacrylate | 32.0 | 10.0 | 19.0 | 14.0 | | 19.0 |
| Polymerization initiator [part] | Azobisisobutyronitrile | 4.0 | 4.0 | 4.0 | 4.0 | 4.0 | 6.5 |
| Characteristics | Weight-average molecular weight | 15,100 | 15,000 | 15,500 | 15,600 | 15,500 | 4,000 |
| | Acid value [mgKOH/g] | 98 | 100 | 80 | 150 | 100 | 99 |
| | Proportion of unit having polysiloxane structure [%] | 20.0 | 20.0 | 20.0 | 20.0 | 50.0 | 20.0 |
| | Proportion of nonionic unit [%] | 5.0 | 45.0 | 31.0 | 30.0 | 37.0 | 29.0 |

| | | Graft Polymer No. | | | | | |
|---|---|---|---|---|---|---|---|
| | | 13 | 14 | 15 | 16 | 17 | 18 |
| Monomer [part] | Monomer having polysiloxane structure (*1) | 20.0 | 44.0 | 7.0 | 20.0 | 20.0 | 20.0 |
| | 2-hydroxyethyl acrylate (*2) | | | | | | |
| | 2-hydroxyethyl methacrylate (*3) | 5.0 | 5.0 | 5.0 | 0.7 | 8.0 | 5.0 |
| | Methoxydiethylene glycol monomethacrylate (*4) | 27.0 | 23.0 | 23.0 | 3.3 | 40.0 | 26.0 |
| | Methoxypolyethylene glycol monomethacrylate (*5) | | | | | | |
| | Methoxypolyethylene glycol monomethacrylate (*6) | | | | | | |
| | Acrylic acid | 13.0 | 13.0 | 13.0 | 13.0 | 13.0 | 9.0 |
| | Methyl methacrylate | 18.0 | 8.0 | 26.0 | 31.0 | 10.0 | 20.0 |
| | Butyl methacrylate | 17.0 | 7.0 | 26.0 | 32.0 | 9.0 | 20.0 |
| Polymerization initiator [part] | Azobisisobutyronitrile | 1.0 | 4.0 | 4.0 | 4.0 | 4.0 | 4.0 |
| Characteristics | Weight-average molecular weight | 55,000 | 15,300 | 15,000 | 14,900 | 15,100 | 15,300 |
| | Acid value [mgKOH/g] | 102 | 102 | 101 | 99 | 102 | 70 |
| | Proportion of unit having polysiloxane structure [%] | 20.0 | 44.0 | 7.0 | 20.0 | 20.0 | 20.0 |
| | Proportion of nonionic unit [%] | 32.0 | 28.0 | 28.0 | 4.0 | 48.0 | 31.0 |

| | | Graft Polymer No. | | | | |
|---|---|---|---|---|---|---|
| | | 19 | 20 | 21 | 22 | 23 |
| Monomer [part] | Monomer having polysiloxane structure (*1) | 20.0 | 20.0 | 20.0 | 20.0 | |
| | 2-hydroxyethyl acrylate (*2) | | | | | |
| | 2-hydroxyethyl methacrylate (*3) | | 5.0 | | | 5.0 |
| | Methoxydiethylene glycol monomethacrylate (*4) | | 27.0 | | | 27.0 |
| | Methoxypolyethylene glycol monomethacrylate (*5) | | | 30.0 | | |
| | Methoxypolyethylene glycol monomethacrylate (*6) | | | | 30.0 | |

TABLE 1-continued

| Composition and characteristics of graft polymer | | | | | | |
|---|---|---|---|---|---|---|
| | Acrylic acid | 15.0 | 13.0 | 13.0 | 13.0 | 13.0 |
| | Methyl methacrylate | 16.0 | 19.0 | 19.0 | 33.0 | 28.0 |
| | Butyl methacrylate | 17.0 | 18.0 | 18.0 | 34.0 | 27.0 |
| Polymerization initiator [part] | Azobisisobutyronitrile | 4.0 | 4.0 | 4.0 | 4.0 | 4.0 |
| Characteristics | Weight-average molecular weight | 15,500 | 15,300 | 15,200 | 15,400 | 15,500 |
| | Acid value [mgKOH/g] | 160 | 104 | 104 | 97 | 101 |
| | Proportion of unit having polysiloxane structure [%] | 20.0 | 20.0 | 20.0 | 20.0 | 0.0 |
| | Proportion of nonionic unit [%] | 32.0 | 30.0 | 29.0 | 0.0 | 32.0 |

<Measurement of Weight-Average Molecular Weight>

It should be noted that the weight-average molecular weight of each of the compounds obtained in the foregoing was measured as described below. A silicone oil or silicone graft polymer as a measuring object was put into tetrahydrofuran (THF), and was left at rest for several hours so as to dissolve therein, whereby a solution having a sample concentration of 0.1 mass % was prepared. After that, the solution was filtrated with a solvent-resistant membrane filter having a pore size of 0.45 µm (trade name: TITAN 2 Syringe Filter, PTFE, 0.45 µm; manufactured by SUN-SRi Co.), whereby a sample solution was prepared. The weight-average molecular weight was measured with the sample solution under the following conditions.

Apparatus: Alliance GPC 2695 (manufactured by Waters Corporation)
Column: Quaternary column, Shodex KF-806M (manufactured by SHOWA DENKO K.K.)
Mobile phase: Tetrahydrofuran (reagent grade)
Flow rate: 1.0 mL/min
Oven temperature: 40.0° C.
Injection amount of sample solution: 0.1 mL
Detector: RI (refractive index)
Polystyrene standard samples: PS-1 and PS-2 (manufactured by Polymer Laboratories Co.)(Molecular weights (17 molecular weights): 7,500,000, 2,560,000, 841,700, 377,400, 320,000, 210,500, 148,000, 96,000, 59,500, 50,400, 28,500, 20,650, 10,850, 5,460, 2,930, 1,300, and 580)

<Preparation of Inks>

The respective inks to be used in the examples and the comparative examples were prepared according to the respective compositions shown in the upper part of Tables 2 and 3 including the pigment dispersion liquid prepared in the foregoing, the silicone oils synthesized in the foregoing or commercially available silicone oils, and the silicone graft polymers synthesized in the foregoing. In addition, Ink 3-1 to be used in a comparative example was prepared according to the composition shown in Table 4. To be specific, the respective components shown in Tables 2 to 4 were mixed according to the composition shown in the tables, and the mixture was sufficiently stirred. After that, the resultant was filtrated under pressure with a polypropylene filter having a pore size of 1.2 µm (manufactured by Nihon Pall Ltd.), whereby each ink was prepared. It should be noted that the symbol "MW" in Table 2 refers to a weight-average molecular weight, the term "Acetylenol E100" in Tables 2 to 4 refers to a surfactant manufactured by Kawaken Fine Chemicals Co., Ltd., and the term "polyethylene glycol" in Table 3 refers to a polyethylene glycol having an average molecular weight of 600. In addition, the term "specific water-soluble organic compound" in Table 3 refers to a water-soluble organic compound selected from the group consisting of the compounds represented by the general formulae (II), (III), and (IV). In addition, the term "specific graft polymer" in Table 3 below refers to a graft polymer specified in the present invention; to be more specific, the term refers to any one of Graft Polymers 1 to 19. Of the respective inks described in Tables 2 to 4, Inks 1-1 to 1-13 each satisfy the requirements for the first ink specified in the present invention, and Inks 2-1 to 2-33 each satisfy the requirements for the second ink specified in the present invention.

TABLE 2

| Composition of ink | | | | | | | |
|---|---|---|---|---|---|---|---|
| | First ink No. | | | | | | |
| | 1-1 | 1-2 | 1-3 | 1-4 | 1-5 | 1-6 | 1-7 |
| Pigment dispersion liquid | 30.0 | 30.0 | 30.0 | 30.0 | 30.0 | 30.0 | 30.0 |
| KF-96-100cs (manufactured by Shin-Etsu Chemical Co., Ltd.) (MW 7,000/HLB0) | 0.1 | | | | | | |
| Silicone Oil 1 (MW 5,100/HLB0) | | 0.1 | | | | | |
| FZ-2207 (manufactured by Dow Corning Toray Co., Ltd.) (MW 39,300/HLB3) | | | 0.5 | | | | |
| Silicone Oil 2 (MW 20,000/HLB7) | | | | 0.5 | | | |
| FZ-2118 (manufactured by Dow Corning Toray Co., Ltd.) (MW 7,400/HLB12) | | | | | 0.5 | | |
| FZ-2163 (manufactured by Dow Corning Toray Co., Ltd.) (MW 11,000/HLB13) | | | | | | 0.5 | |

TABLE 2-continued

| Composition of ink | | | | | | | |
|---|---|---|---|---|---|---|---|
| Silicone Oil 3 (MW 2,500/HLB7) | | | | | | | 0.5 |
| Silicone Oil 4 (MW 3,000/HLB7) | | | | | | | |
| Silicone Oil 5 (MW 30,000/HLB7) | | | | | | | |
| Silicone Oil 6 (MW 35,000/HLB7) | | | | | | | |
| Glycerin | 8.0 | 8.0 | 8.0 | 8.0 | 8.0 | 8.0 | 8.0 |
| Triethylene glycol | 10.0 | 10.0 | 10.0 | 10.0 | 10.0 | 10.0 | 10.0 |
| Acetone | 3.0 | 3.0 | | | | | |
| Acetylenol E100 | 1.0 | 1.0 | 1.0 | 1.0 | 1.0 | 1.0 | 1.0 |
| Pure water | 47.9 | 47.9 | 50.5 | 50.5 | 50.5 | 50.5 | 50.5 |
| HLB of silicone oil | 0 | 0 | 3 | 7 | 12 | 13 | 7 |
| Weight-average molecular weight of silicone oil | 7,000 | 5,100 | 39,300 | 20,000 | 7,400 | 11,000 | 2,500 |
| Content of silicone oil [%] | 0.1 | 0.1 | 0.5 | 0.5 | 0.5 | 0.5 | 0.5 |

| | First ink No. | | | | | |
|---|---|---|---|---|---|---|
| | 1-8 | 1-9 | 1-10 | 1-11 | 1-12 | 1-13 |
| Pigment dispersion liquid | 30.0 | 30.0 | 30.0 | 30.0 | 30.0 | 30.0 |
| KF-96-100cs (manufactured by Shin-Etsu Chemical Co., Ltd.) (MW 7,000/HLB0) | | | | | | |
| Silicone Oil 1 (MW 5,100/HLB0) | | | | | | |
| FZ-2207 (manufactured by Dow Corning Toray Co., Ltd.) (MW 39,300/HLB3) | | | | | | |
| Silicone Oil 2 (MW 20,000/HLB7) | | | | 0.01 | 5.0 | 6.0 |
| FZ-2118 (manufactured by Dow Corning Toray Co., Ltd.) (MW 7,400/HLB12) | | | | | | |
| FZ-2163 (manufactured by Dow Corning Toray Co., Ltd.) (MW 11,000/HLB13) | | | | | | |
| Silicone Oil 3 (MW 2,500/HLB7) | | | | | | |
| Silicone Oil 4 (MW 3,000/HLB7) | 0.5 | | | | | |
| Silicone Oil 5 (MW 30,000/HLB7) | | 0.5 | | | | |
| Silicone Oil 6 (MW 35,000/HLB7) | | | 0.5 | | | |
| Glycerin | 8.0 | 8.0 | 8.0 | 8.0 | 8.0 | 8.0 |
| Triethylene glycol | 10.0 | 10.0 | 10.0 | 10.0 | 10.0 | 10.0 |
| Acetone | | | | | | |
| Acetylenol E100 | 1.0 | 1.0 | 1.0 | 1.0 | 1.0 | 1.0 |
| Pure water | 50.5 | 50.5 | 50.5 | 50.99 | 46.0 | 45.0 |
| HLB of silicone oil | 7 | 7 | 7 | 7 | 7 | 7 |
| Weight-average molecular weight of silicone oil | 3,000 | 30,000 | 35,000 | 20,000 | 20,000 | 20,000 |
| Content of silicone oil [%] | 0.5 | 0.5 | 0.5 | 0.01 | 5.0 | 6.0 |

TABLE 3

| Composition of ink | | | | | | | |
|---|---|---|---|---|---|---|---|
| | Second ink No. | | | | | | |
| | 2-1 | 2-2 | 2-3 | 2-4 | 2-5 | 2-6 | 2-7 |
| Pigment dispersion liquid | 30.0 | 30.0 | 30.0 | 30.0 | 30.0 | 30.0 | 30.0 |
| Graft polymer 1 | 2.0 | | | | | | |
| Graft polymer 2 | | 2.0 | | | | | |
| Graft polymer 3 | | | 2.0 | | | | |
| Graft polymer 4 | | | | 2.0 | | | |
| Graft polymer 5 | | | | | 2.0 | | |
| Graft polymer 6 | | | | | | 2.0 | |
| Graft polymer 7 | | | | | | | 2.0 |
| Graft polymer 8 | | | | | | | |
| Graft polymer 9 | | | | | | | |
| Graft polymer 10 | | | | | | | |
| Graft polymer 11 | | | | | | | |
| Graft polymer 12 | | | | | | | |
| Graft polymer 13 | | | | | | | |
| Glycerin | 15.0 | 15.0 | 15.0 | 15.0 | 15.0 | 15.0 | 15.0 |
| Polyethylene glycol | 5.0 | 5.0 | 5.0 | 5.0 | 5.0 | 5.0 | 5.0 |

TABLE 3-continued

Composition of ink

| | | | | | | | |
|---|---|---|---|---|---|---|---|
| Acetylenol E100 | 1.0 | 1.0 | 1.0 | 1.0 | 1.0 | 1.0 | 1.0 |
| Ethylene urea | | | | | | | |
| 2-pyrrolidone | 2.0 | 2.0 | 2.0 | 2.0 | 2.0 | 2.0 | 2.0 |
| N-methyl-2-pyrrolidone | | | | | | | |
| 1,2-hexanediol | 2.0 | 2.0 | 2.0 | 2.0 | 2.0 | 2.0 | 2.0 |
| Pure water | 43.0 | 43.0 | 43.0 | 43.0 | 43.0 | 43.0 | 43.0 |
| Graft Polymer No. | 1 | 2 | 3 | 4 | 5 | 6 | 7 |
| Weight-average molecular weight | 15,500 | 15,800 | 50,000 | 5,000 | 15,500 | 15,900 | 15,100 |
| Acid value [mgKOH/g] | 100 | 99 | 98 | 100 | 98 | 99 | 98 |
| Proportion of unit having polysiloxane structure [%] | 20.0 | 20.0 | 20.0 | 20.0 | 10.0 | 40.0 | 20.0 |
| Proportion of nonionic unit [%] | 30.0 | 29.0 | 30.0 | 31.0 | 31.0 | 29.0 | 5.0 |
| Content of specific graft polymer [%] | 2.0 | 2.0 | 2.0 | 2.0 | 2.0 | 2.0 | 2.0 |
| Content of specific water-soluble organic compound [%] | 4.0 | 4.0 | 4.0 | 4.0 | 4.0 | 4.0 | 4.0 |
| Content of specific water-soluble organic compound/Content of specific graft polymer | 2.0 | 2.0 | 2.0 | 2.0 | 2.0 | 2.0 | 2.0 |

| | Second ink No. | | | | | |
|---|---|---|---|---|---|---|
| | 2-8 | 2-9 | 2-10 | 2-11 | 2-12 | 2-13 |
| Pigment dispersion liquid | 30.0 | 30.0 | 30.0 | 30.0 | 30.0 | 30.0 |
| Graft polymer 1 | | | | | | |
| Graft polymer 2 | | | | | | |
| Graft polymer 3 | | | | | | |
| Graft polymer 4 | | | | | | |
| Graft polymer 5 | | | | | | |
| Graft polymer 6 | | | | | | |
| Graft polymer 7 | | | | | | |
| Graft polymer 8 | 2.0 | | | | | |
| Graft polymer 9 | | 2.0 | | | | |
| Graft polymer 10 | | | 2.0 | | | |
| Graft polymer 11 | | | | 2.0 | | |
| Graft polymer 12 | | | | | 2.0 | |
| Graft polymer 13 | | | | | | 2.0 |
| Glycerin | 15.0 | 15.0 | 15.0 | 15.0 | 15.0 | 15.0 |
| Polyethylene glycol | 5.0 | 5.0 | 5.0 | 5.0 | 5.0 | 5.0 |
| Acetylenol E100 | 1.0 | 1.0 | 1.0 | 1.0 | 1.0 | 1.0 |
| Ethylene urea | | | | | | |
| 2-pyrrolidone | 2.0 | 2.0 | 2.0 | 2.0 | 2.0 | 2.0 |
| N-methyl-2-pyrrolidone | | | | | | |
| 1,2-hexanediol | 2.0 | 2.0 | 2.0 | 2.0 | 2.0 | 2.0 |
| Pure water | 43.0 | 43.0 | 43.0 | 43.0 | 43.0 | 43.0 |
| Graft Polymer No. | 8 | 9 | 10 | 11 | 16 | 17 |
| Weight-average molecular weight | 15,000 | 15,500 | 15,600 | 15,500 | 4,000 | 55,000 |
| Acid value [mgKOH/g] | 100 | 80 | 150 | 100 | 99 | 102 |
| Proportion of unit having polysiloxane structure [%] | 20.0 | 20.0 | 20.0 | 50.0 | 20.0 | 20.0 |
| Proportion of nonionic unit [%] | 45.0 | 31.0 | 30.0 | 37.0 | 29.0 | 32.0 |
| Content of specific graft polymer [%] | 2.0 | 2.0 | 2.0 | 2.0 | 2.0 | 2.0 |
| Content of specific water-soluble organic compound [%] | 4.0 | 4.0 | 4.0 | 4.0 | 4.0 | 4.0 |
| Content of specific water-soluble organic compound/Content of specific graft polymer | 2.0 | 2.0 | 2.0 | 2.0 | 2.0 | 2.0 |

| | Second ink No. | | | | | | |
|---|---|---|---|---|---|---|---|
| | 2-14 | 2-15 | 2-16 | 2-17 | 2-18 | 2-19 | 2-20 |
| Pigment dispersion liquid | 30.0 | 30.0 | 30.0 | 30.0 | 30.0 | 30.0 | 30.0 |
| Graft polymer 2 | | | | | | | 2.0 |
| Graft polymer 14 | 2.0 | | | | | | |
| Graft polymer 15 | | 2.0 | | | | | |
| Graft polymer 16 | | | 2.0 | | | | |
| Graft polymer 17 | | | | 2.0 | | | |
| Graft polymer 18 | | | | | 2.0 | | |
| Graft polymer 19 | | | | | | 2.0 | |
| Glycerin | 15.0 | 15.0 | 15.0 | 15.0 | 15.0 | 15.0 | 15.0 |
| Polyethylene glycol | 5.0 | 5.0 | 5.0 | 5.0 | 5.0 | 5.0 | 5.0 |
| Acetylenol E100 | 1.0 | 1.0 | 1.0 | 1.0 | 1.0 | 1.0 | 1.0 |
| Ethylene urea | | | | | | | 4.0 |
| 2-pyrrolidone | 2.0 | 2.0 | 2.0 | 2.0 | 2.0 | 2.0 | |
| N-methyl-2-pyrrolidone | | | | | | | |
| 1,2-hexanediol | 2.0 | 2.0 | 2.0 | 2.0 | 2.0 | 2.0 | |
| Pure water | 43.0 | 43.0 | 43.0 | 43.0 | 43.0 | 43.0 | 43.0 |
| Graft Polymer No. | 18 | 19 | 20 | 21 | 22 | 23 | 2 |
| Weight-average molecular weight | 15,300 | 15,000 | 14,900 | 15,100 | 15,300 | 15,500 | 15,800 |

TABLE 3-continued

| Composition of ink | | | | | | | |
|---|---|---|---|---|---|---|---|
| Acid value [mgKOH/g] | 102 | 101 | 99 | 102 | 70 | 160 | 99 |
| Proportion of unit having polysiloxane structure [%] | 44.0 | 7.0 | 20.0 | 20.0 | 20.0 | 20.0 | 20.0 |
| Proportion of nonionic unit [%] | 28.0 | 28.0 | 4.0 | 30.0 | 31.0 | 32.0 | 29.0 |
| Content of specific graft polymer [%] | 2.0 | 2.0 | 2.0 | 2.0 | 2.0 | 2.0 | 2.0 |
| Content of specific water-soluble organic compound [%] | 4.0 | 4.0 | 4.0 | 4.0 | 4.0 | 4.0 | 4.0 |
| Content of specific water-soluble organic compound/Content of specific graft polymer | 2.0 | 2.0 | 2.0 | 2.0 | 2.0 | 2.0 | 2.0 |

| | Second ink No. | | | | | |
|---|---|---|---|---|---|---|
| | 2-21 | 2-22 | 2-23 | 2-24 | 2-25 | 2-26 |
| Pigment dispersion liquid | 30.0 | 30.0 | 30.0 | 30.0 | 30.0 | 30.0 |
| Graft polymer 2 | 2.0 | 2.0 | 2.0 | 2.0 | 2.0 | 0.5 |
| Graft polymer 14 | | | | | | |
| Graft polymer 15 | | | | | | |
| Graft polymer 16 | | | | | | |
| Graft polymer 17 | | | | | | |
| Graft polymer 18 | | | | | | |
| Graft polymer 19 | | | | | | |
| Glycerin | 15.0 | 15.0 | 15.0 | 15.0 | 15.0 | 15.0 |
| Polyethylene glycol | 5.0 | 5.0 | 5.0 | 5.0 | 5.0 | 5.0 |
| Acetylenol E100 | 1.0 | 1.0 | 1.0 | 1.0 | 1.0 | 1.0 |
| Ethylene urea | | | | | | |
| 2-pyrrolidone | 4.0 | | | | 6.0 | 2.0 |
| N-methyl-2-pyrrolidone | | 4.0 | | | | |
| 1,2-hexanediol | | | 4.0 | | 10.0 | |
| Pure water | 43.0 | 43.0 | 43.0 | 47.0 | 31.0 | 46.5 |
| Graft Polymer No. | 2 | 2 | 2 | 2 | 2 | 2 |
| Weight-average molecular weight | 15,800 | 15,800 | 15,800 | 15,800 | 15,800 | 15,800 |
| Acid value [mgKOH/g] | 99 | 99 | 99 | 99 | 99 | 99 |
| Proportion of unit having polysiloxane structure [%] | 20.0 | 20.0 | 20.0 | 20.0 | 20.0 | 20.0 |
| Proportion of nonionic unit [%] | 29.0 | 29.0 | 29.0 | 29.0 | 29.0 | 29.0 |
| Content of specific graft polymer [%] | 2.0 | 2.0 | 2.0 | 2.0 | 2.0 | 0.5 |
| Content of specific water-soluble organic compound [%] | 4.0 | 4.0 | 4.0 | 0.0 | 16.0 | 2.0 |
| Content of specific water-soluble organic compound/Content of specific graft polymer | 2.0 | 2.0 | 2.0 | 0.0 | 8.0 | 4.0 |

| | Second ink No. | | | | | |
|---|---|---|---|---|---|---|
| | 2-27 | 2-28 | 2-29 | 2-30 | 2-31 | 2-32 |
| Pigment dispersion liquid | 30.0 | 30.0 | 30.0 | 30.0 | 30.0 | 30.0 |
| Graft polymer 2 | 0.5 | 0.5 | 0.5 | 2.0 | 2.0 | 0.5 |
| Graft polymer 20 | | | | | | |
| Graft polymer 21 | | | | | | |
| Graft polymer 22 | | | | | | |
| Graft polymer 23 | | | | | | |
| Glycerin | 15.0 | 15.0 | 15.0 | 15.0 | 15.0 | 15.0 |
| Polyethylene glycol | 5.0 | 5.0 | 5.0 | 5.0 | 5.0 | 5.0 |
| Acetylenol E100 | 1.0 | 1.0 | 1.0 | 1.0 | 1.0 | 1.0 |
| Ethylene urea | | | | | | |
| 2-pyrrolidone | 2.0 | 5.0 | 10.0 | 1.5 | 8.0 | 1.0 |
| N-methyl-2-pyrrolidone | | | | | | |
| 1,2-hexanediol | 2.5 | 5.0 | 10.0 | 1.5 | 8.0 | 0.5 |
| Pure water | 43.5 | 38.5 | 28.5 | 44.0 | 31.0 | 47.0 |
| Graft Polymer No. | 2 | 2 | 2 | 2 | 2 | 2 |
| Weight-average molecular weight | 15,800 | 15,800 | 15,800 | 15,800 | 15,800 | 15,800 |
| Acid value [mgKOH/g] | 99 | 99 | 99 | 99 | 99 | 99 |
| Proportion of unit having polysiloxane structure [%] | 20.0 | 20.0 | 20.0 | 20.0 | 20.0 | 20.0 |
| Proportion of nonionic unit [%] | 29.0 | 29.0 | 29.0 | 29.0 | 29.0 | 29.0 |
| Content of specific graft polymer [%] | 0.5 | 0.5 | 0.5 | 2.0 | 2.0 | 0.5 |
| Content of specific water-soluble organic compound [%] | 5.0 | 10.0 | 20.0 | 3.0 | 16.0 | 1.5 |
| Content of specific water-soluble organic compound/Content of specific graft polymer | 10.0 | 20.0 | 40.0 | 1.5 | 8.0 | 3.0 |

| | Second ink No. | | | | |
|---|---|---|---|---|---|
| | 2-33 | 2-34 | 2-35 | 2-36 | 2-37 |
| Pigment dispersion liquid | 30.0 | 30.0 | 30.0 | 30.0 | 30.0 |
| Graft polymer 2 | 3.0 | | | | |
| Graft polymer 20 | | 2.0 | | | |
| Graft polymer 21 | | | 2.0 | | |
| Graft polymer 22 | | | | 2.0 | |
| Graft polymer 23 | | | | | 2.0 |

TABLE 3-continued

| Composition of ink | | | | | |
|---|---|---|---|---|---|
| Glycerin | 15.0 | 15.0 | 15.0 | 15.0 | 15.0 |
| Polyethylene glycol | 5.0 | 5.0 | 5.0 | 5.0 | 5.0 |
| Acetylenol E100 | 1.0 | 1.0 | 1.0 | 1.0 | 1.0 |
| Ethylene urea | | | | | |
| 2-pyrrolidone | 11.0 | 2.0 | 2.0 | 2.0 | 2.0 |
| N-methyl-2-pyrrolidone | | | | | |
| 1,2-hexanediol | 11.0 | 2.0 | 2.0 | 2.0 | 2.0 |
| Pure water | 24.0 | 43.0 | 43.0 | 43.0 | 43.0 |
| Graft Polymer No. | 2 | 12 | 13 | 14 | 15 |
| Weight-average molecular weight | 15,800 | 15,300 | 15,200 | 15,400 | 15,500 |
| Acid value [mgKOH/g] | 99 | 104 | 104 | 97 | 101 |
| Proportion of unit having polysiloxane structure [%] | 20.0 | 20.0 | 20.0 | 20.0 | 0.0 |
| Proportion of nonionic unit [%] | 29.0 | 30.0 | 29.0 | 0.0 | 32.0 |
| Content of specific graft polymer [%] | 3.0 | 0.0 | 0.0 | 0.0 | 0.0 |
| Content of specific water-soluble organic compound [%] | 22.0 | 4.0 | 4.0 | 4.0 | 4.0 |
| Content of specific water-soluble organic compound/Content of specific graft polymer | 7.3 | — | — | — | — |

TABLE 4

| Composition of ink (Unit: %) | |
|---|---|
| | Ink No. 3-1 |
| Pigment dispersion liquid | 30.0 |
| Glycerin | 8.0 |
| Triethylene glycol | 10.0 |
| Acetylenol E100 | 1.0 |
| Pure water | 51.0 |

<Constitution of Ink Set>

Ink sets were obtained by using the respective inks obtained in the foregoing according to the combinations shown in Table 5. Each ink of each ink set was charged into an ink cartridge of an ink jet recording apparatus (trade name: PIXUS iP3100; manufactured by Canon Inc.), and thus the ink was set in the ink jet recording apparatus. It should be noted that the first ink used in the ink set of each of the examples and the comparative examples was mounted at the cyan ink position of the ink jet recording apparatus, and the second ink used in the ink set was mounted at the magenta ink position of the ink jet recording apparatus. In addition, an image recorded by applying the first and second inks to a recording medium so that the inks overlap each other was defined as a secondary color image.

<Evaluation>

Evaluation of Graininess

The following images were recorded with an ink jet recording apparatus (trade name: PIXUS iP3100; manufactured by Canon Inc.) provided with the respective inks of each ink set obtained in the foregoing on a recording medium (Canon Photopaper Professional PR-201; manufactured by Canon Inc.). To be specific, images each including a solid portion having a recording duty of 25%, 50%, 75%, and 100% were recorded with the first or second ink by such a four-pass recording that a recording head was caused to wait on a home position side for 5 seconds for each recording pass. In addition, images each including a secondary color solid portion having a total recording duty of the first and second inks of 25%, 50%, 75%, and 100% were recorded with these inks by such a four-pass recording that the recording head was caused to wait on the home position side for 5 seconds for each recording pass. It should be noted that, upon recording of the secondary color images, the mass ratio between the application amount of the first ink and the application amount of the second ink at each recording duty was set to 1:1, and the respective inks were applied to the same position in the same recording pass. Here, as described above, graininess in an image tends to be more remarkable as the width of a main scanning of the recording head increases. In addition, the recording medium applicable to the ink jet recording apparatus used in the evaluation was of a letter size or A4 size, so the recording head was caused to wait for several seconds between recording passes in order that recording conditions similar to those for a wide format printer capable of recording on, for example, A0- or A1-size paper were established. In other words, performance evaluation applicable also to the wide format printer was performed under such conditions. Evaluation of image graininess was performed by observing a recorded article obtained as described above with the eyes or a loupe. The criteria of the evaluation of image graininess are as described below. Table 5 shows the results of the evaluation. In the present invention, the levels above B in the following evaluation criteria were each defined as an acceptable graininess level.

A: No unevenness was present in any one of the images of all recording duties.

B: Unevenness observable with the loupe was present in an image of at least one recording duty.

C: Unevenness observable with the eyes was present in an image of at least one recording duty.

Evaluation of Water Fastness

The following images were recorded with an ink jet recording apparatus (trade name: PIXUS iP3100; manufactured by Canon Inc.) provided with the respective inks of each ink set obtained in the foregoing on a recording medium (PB PAPER GF500; manufactured by Canon Inc.). To be specific, a solid image having a recording duty of 100% was recorded with the first or second ink. In addition, a secondary color solid image having a total recording duty of the first and second inks of 100% was recorded with these inks. It should be noted that, upon recording of the secondary color image, the mass ratio between the application amount of the first ink and the application amount of the second ink at each recording duty was set to 1:1, and the respective inks were applied to the same position in the same recording pass. In addition, 1 hour after the recording of each of the resultant images, 1 mL of running water was dropped to the solid image portion, and, 60 seconds after the dropping, the running water was wiped off with lens-cleaning paper. After that, the image was evaluated for water fastness by visually observing the state of each ink remaining in the image portion. The criteria of the evaluation of the water fastness of each image are as described below.

Table 5 shows the results of the evaluation. In the present invention, the levels above B in the following evaluation criteria were each defined as an acceptable water fastness level.

A: The ink was not eluted, or the ink was slightly eluted, but the elution was not remarkable.
B: The ink was eluted, and a difference between the image before the dropping of the running water and the image after the dropping was slightly recognized.
C: The ink was eluted, and a white portion of the recording medium was conspicuous.

Evaluation of Ejection Characteristics: Ejection Stability and State of Facing Surface The following images were recorded with an ink jet recording apparatus (trade name: PIXUS iP3100; manufactured by Canon Inc.) provided with the respective inks of which each ink set obtained in the foregoing was formed on a recording medium (Office Planner; manufactured by Canon Inc.). To be specific, solid images each having a recording duty of 50% and an area of 18 cm by 24 cm were recorded with the first or second ink on three sheets of the Office Planner according to a default mode. After that, the nozzle check pattern of the PIXUS iP3100 was recorded. Evaluation of ejection stability was performed by visually observing the resultant nozzle check pattern. The criteria of the evaluation of ejection stability are as described below. Table 5 shows the results of the evaluation. In addition, evaluation of the state of the facing surface was performed by visually observing the state of the surface of a recording head after the recording of the nozzle check pattern. The criteria of the evaluation for the state of the facing surface are as described below. Table 5 shows the results of the evaluation.

<Ejection Stability>
A: No disturbance was observed in the nozzle check pattern, so normal recording was attained.
B: Slight disturbance was observed in the nozzle check pattern, but the pattern was free of any portion where no ink was ejected.
C: The nozzle check pattern had a portion where no ink was ejected and disturbance to some extent, but the portion and the disturbance were each at an acceptable level.

<State of Facing Surface>
A: Almost no ink was present around each ejection orifice.
B: A few ink droplets were present around each ejection orifice.
C: A zonal ink liquid film was present around each ejection orifice, but was at an acceptable level.

TABLE 5

Constitution of ink set and results of evaluation

| | | Ink | | | Graininess | | | Water fastness | | | Ejection stability | | State of facing surface | |
|---|---|---|---|---|---|---|---|---|---|---|---|---|---|---|
| | | set No. | First ink | Second ink | First ink | Second ink | Secondary color | First ink | Second ink | Secondary color | First ink | Second ink | First ink | Second ink |
| Example | 1 | 1 | 1-1 | 2-1 | A | A | A | B | B | A | A | A | A | A |
| | 2 | 2 | 1-2 | 2-1 | A | A | A | B | B | A | A | A | A | A |
| | 3 | 3 | 1-3 | 2-1 | A | A | A | C | B | A | A | A | A | A |
| | 4 | 4 | 1-4 | 2-1 | A | A | A | B | B | A | A | A | A | A |
| | 5 | 5 | 1-5 | 2-1 | A | A | A | C | B | B | A | A | A | A |
| | 6 | 6 | 1-6 | 2-1 | B | A | A | C | B | A | A | A | A | A |
| | 7 | 7 | 1-7 | 2-1 | B | A | B | C | B | B | A | A | A | A |
| | 8 | 8 | 1-8 | 2-1 | A | A | A | C | B | A | A | A | A | A |
| | 9 | 9 | 1-9 | 2-1 | A | A | A | C | B | A | B | A | A | A |
| | 10 | 10 | 1-10 | 2-1 | A | A | A | C | B | B | C | A | B | A |
| | 11 | 11 | 1-11 | 2-1 | C | A | B | A | B | B | A | A | A | A |
| | 12 | 12 | 1-12 | 2-1 | A | A | A | A | B | A | B | A | A | A |
| | 13 | 13 | 1-13 | 2-1 | A | A | A | A | B | A | C | A | B | A |
| | 14 | 14 | 1-1 | 2-2 | A | A | A | B | B | A | A | A | A | A |
| | 15 | 15 | 1-1 | 2-3 | A | B | B | B | A | A | A | B | A | B |
| | 16 | 16 | 1-1 | 2-4 | A | A | A | B | B | B | A | A | A | A |
| | 17 | 17 | 1-1 | 2-5 | A | B | A | B | B | B | A | A | A | A |
| | 18 | 18 | 1-1 | 2-6 | A | A | A | B | A | A | A | A | A | B |
| | 19 | 19 | 1-1 | 2-7 | A | B | A | B | A | A | A | B | A | B |
| | 20 | 20 | 1-1 | 2-8 | A | A | A | B | B | A | A | A | A | A |
| | 21 | 21 | 1-1 | 2-9 | A | B | A | B | A | A | A | B | A | B |
| | 22 | 22 | 1-1 | 2-10 | A | A | A | B | A | A | A | A | A | A |
| | 23 | 23 | 1-1 | 2-11 | A | A | A | B | A | A | A | B | A | C |
| | 24 | 24 | 1-1 | 2-12 | A | B | B | B | B | B | A | A | A | A |
| | 25 | 25 | 1-1 | 2-13 | A | B | B | B | A | A | A | C | A | B |
| | 26 | 26 | 1-1 | 2-14 | A | A | A | B | A | A | A | B | A | C |
| | 27 | 27 | 1-1 | 2-15 | A | B | B | B | B | B | A | A | A | A |
| | 28 | 28 | 1-1 | 2-16 | A | B | B | B | A | A | A | A | A | A |
| | 29 | 29 | 1-1 | 2-17 | A | A | A | B | B | B | A | A | A | A |
| | 30 | 30 | 1-1 | 2-18 | A | B | A | B | A | B | A | C | A | C |
| | 31 | 31 | 1-1 | 2-19 | A | A | A | B | B | B | A | A | A | A |
| | 32 | 32 | 1-1 | 2-20 | A | A | A | B | A | A | A | A | A | A |
| | 33 | 33 | 1-1 | 2-21 | A | A | A | B | A | A | A | A | A | A |
| | 34 | 34 | 1-1 | 2-22 | A | A | A | B | A | A | A | A | A | A |
| | 35 | 35 | 1-1 | 2-23 | A | A | A | B | A | A | A | A | A | A |
| | 36 | 36 | 1-1 | 2-24 | A | A | A | B | B | B | A | B | A | A |
| | 37 | 37 | 1-1 | 2-25 | A | A | A | B | A | A | A | B | A | A |
| | 38 | 38 | 1-1 | 2-26 | A | B | A | B | B | B | A | B | A | A |
| | 39 | 39 | 1-1 | 2-27 | A | A | A | B | B | A | A | B | A | A |
| | 40 | 40 | 1-1 | 2-28 | A | A | A | B | B | A | A | B | A | A |
| | 41 | 41 | 1-1 | 2-29 | A | A | A | B | B | A | A | C | A | B |

TABLE 5-continued

Constitution of ink set and results of evaluation

| | | Ink set No. | First ink | Second ink | Graininess | | | Water fastness | | | Ejection stability | | State of facing surface | |
|---|---|---|---|---|---|---|---|---|---|---|---|---|---|---|
| | | | | | First ink | Second ink | Secondary color | First ink | Second ink | Secondary color | First ink | Second ink | First ink | Second ink |
| | 42 | 42 | 1-1 | 2-30 | A | A | A | B | B | B | A | A | A | A |
| | 43 | 43 | 1-1 | 2-31 | A | A | A | B | A | A | A | B | A | A |
| | 44 | 44 | 1-1 | 2-32 | A | B | B | B | B | B | A | A | A | A |
| | 45 | 45 | 1-1 | 2-33 | A | A | A | B | A | A | A | C | A | B |
| Comparative Example | 1 | 46 | 1 | 1 | B | B | B | C | C | C | A | A | A | A |
| | 2 | 47 | 1-1 | 1-1 | A | A | A | C | C | C | A | A | A | A |
| | 3 | 48 | 2-1 | 2-1 | A | A | C | B | B | B | A | A | A | A |
| | 4 | 49 | 1-1 | 1 | A | B | B | C | C | C | A | A | A | A |
| | 5 | 50 | 1 | 2-1 | B | A | B | C | B | C | A | A | A | A |
| | 6 | 51 | 1-1 | 2-34 | A | C | C | B | A | B | A | A | A | B |
| | 7 | 52 | 1-1 | 2-35 | A | B | B | B | C | C | A | A | A | A |
| | 8 | 53 | 1-1 | 2-36 | A | C | C | B | A | B | A | A | A | B |
| | 9 | 54 | 1-1 | 2-37 | A | C | C | B | C | C | A | A | A | A |

Ratio Between Application Amounts

A secondary color image was evaluated for its graininess and water fastness by the same methods as those described above on the basis of the same evaluation criteria as those described above except that the mass ratio between the application amounts of the first and second inks of the ink set of Example 1 obtained in the foregoing was changed as shown in Table 6. Table 6 shows the results of the evaluation. It should be noted that Table 6 shows the results of the evaluation of graininess and water fastness obtained for the ink set of Example 1 as well for comparison (the mass ratio between the application amounts was 1:1).

TABLE 6

Results of evaluation

| | | First ink | Second ink | Mass ratio between application amounts (First ink:Second ink) | Graininess of secondary color | Water fastness of secondary color |
|---|---|---|---|---|---|---|
| Example | 1 | 1-1 | 2-1 | 1:1 | A | A |
| | 46 | | | 1:25 | A | A |
| | 47 | | | 1:50 | A | B |
| | 48 | | | 1:100 | B | B |
| | 49 | | | 25:1 | A | A |
| | 50 | | | 50:1 | A | A |
| | 51 | | | 100:1 | B | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-205348, filed Aug. 8, 2008, which is hereby incorporated by reference herein in its entirety.

What is claimed is:

1. An ink jet recording method using an ink set having a first ink and a second ink independently, the method comprising:
ejecting each ink of the ink set from a recording head and applying each ink to a recording medium to perform recording,
wherein the first ink comprises a pigment and a silicone oil,
the second ink comprises a pigment and a graft polymer, the graft polymer including at least a nonionic unit represented by the following general formula (I) and a unit having a polysiloxane structure, and
the first ink and the second ink are applied to the recording medium so as to overlap each other at least partly:

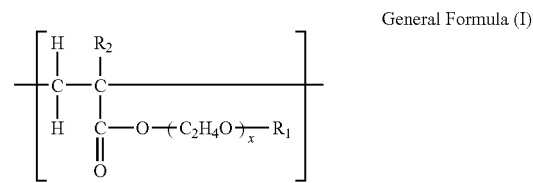

General Formula (I)

where $R_1$ and $R_2$ each independently represent a hydrogen atom or a methyl group, and x represents 1 or 2.

2. An ink jet recording method according to claim 1, wherein the second ink further comprises a water-soluble polymer for dispersing the pigment.

3. An ink jet recording method according to claim 1, wherein the first ink further comprises a water-soluble polymer for dispersing the pigment.

4. An ink jet recording method according to claim 1, wherein both of the first ink and the second ink further comprise a water-soluble polymer for dispersing the pigment.

5. An ink jet recording method according to claim 1, wherein the silicone oil has an HLB of 12 or less.

6. An ink jet recording method according to claim 1, wherein the silicone oil has a weight-average molecular weight of 3,000 to 30,000.

7. An ink jet recording method according to claim 1, wherein a content (mass %) of the silicone oil in the first ink is 0.05 mass % or more with reference to a total mass of the first ink.

8. An ink jet recording method according to claim 1, wherein the graft polymer has a weight-average molecular weight of 5,000 to 50,000.

9. An ink jet recording method according to claim 1, wherein a proportion of the unit having a polysiloxane structure with reference to a total mass of the graft polymer is 10.0 mass % to 40.0 mass %.

10. An ink jet recording method according to claim 1, wherein a proportion of the nonionic unit represented by the general formula (I) with reference to a total mass of the graft polymer is 5.0 mass % to 45.0 mass %.

11. An ink jet recording method according to claim 1, wherein the graft polymer further includes a unit having an acidic group and has an acid value of 80 mgKOH/g to 150 mgKOH/g.

12. An ink jet recording method according to claim 1, wherein a content (mass %) of the graft polymer in the second ink is 0.5 mass % or more with reference to a total mass of the second ink.

13. An ink jet recording method according to claim 1, wherein the second ink further comprises a water-soluble organic compound that is at least one compound selected from the group consisting of compounds represented by the following general formulae (II), (III), and (IV):

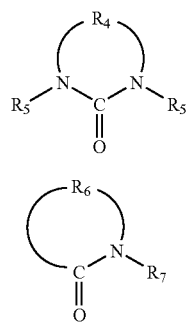

General formula (II)

General formula (III)

-continued

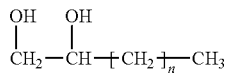

General formula (IV)

where $R_4$ represents an alkylene group which has 2 to 5 carbon atoms, $R_5$'s each independently represent a hydrogen atom or an alkyl group which has 1 to 4 carbon atoms, $R_6$ represents an alkylene group which has 2 to 5 carbon atoms, $R_7$ represents a hydrogen atom or an alkyl group which has 1 to 4 carbon atoms, and n represents a number of 1 to 3.

14. An ink jet recording method according to claim 13, wherein a total content (mass %) of the compounds represented by the general formulae (II), (III), and (IV) in the second ink is 2.0 times or more as large as the content (mass %) of the graft polymer in the second ink in terms of mass ratio.

15. An ink jet recording method according to claim 13, wherein the total content (mass %) of the compounds represented by the general formulae (II), (III), and (IV) in the second ink is 2.0 mass % or more with reference to the total mass of the second ink.

* * * * *